United States Patent
Kapoor et al.

(10) Patent No.: US 9,275,223 B2
(45) Date of Patent: Mar. 1, 2016

(54) REAL-TIME MODULE PROTECTION

(71) Applicant: McAfee, Inc., Santa Clara, CA (US)

(72) Inventors: Aditya Kapoor, Beaverton, OR (US); Jonathan L. Edwards, Portland, OR (US); Craig Schmugar, Hillsboro, OR (US); Vladimir Konobeev, Mallow (IE); Michael Hughes, San Francisco, CA (US)

(73) Assignee: McAfee, Inc., Santa Clara, CA (US)

( * ) Notice: Subject to any disclaimer, the term of this patent is extended or adjusted under 35 U.S.C. 154(b) by 155 days.

(21) Appl. No.: 13/656,436

(22) Filed: Oct. 19, 2012

(65) Prior Publication Data

US 2014/0115652 A1    Apr. 24, 2014

(51) Int. Cl.
*G06F 21/55* (2013.01)
*G06F 21/56* (2013.01)

(52) U.S. Cl.
CPC ............ *G06F 21/554* (2013.01); *G06F 21/566* (2013.01); *G06F 21/567* (2013.01)

(58) Field of Classification Search
CPC ....... G06F 21/566; G06F 21/00; G06F 21/52; G06F 21/53; G06F 21/554; G06F 11/301; G06F 11/3093; G06F 12/14; G06F 21/572
See application file for complete search history.

(56) References Cited

U.S. PATENT DOCUMENTS

| | | | |
|---|---|---|---|
| 5,490,262 A * | 2/1996 | Tahara | 711/123 |
| 6,014,513 A * | 1/2000 | Voelker et al. | G06F 8/75 717/131 |
| 7,373,519 B1 * | 5/2008 | Nachenberg et al. | 713/187 |
| 7,523,281 B2 * | 4/2009 | Madathilparambil et al. | 711/163 |
| 7,802,110 B2 * | 9/2010 | Morais | 713/193 |
| 7,882,318 B2 * | 2/2011 | Savagaonkar et al. | 711/163 |
| 8,127,358 B1 * | 2/2012 | Lee | 726/24 |
| 8,505,101 B1 * | 8/2013 | Lee | 726/24 |
| 2003/0037237 A1 * | 2/2003 | Abgrall et al. | G06F 21/53 713/166 |
| 2004/0093505 A1 * | 5/2004 | Hatakeyama et al. | 713/189 |
| 2004/0123117 A1 * | 6/2004 | Berger | 713/188 |
| 2008/0120611 A1 | 5/2008 | Aaron | |
| 2008/0162849 A1 * | 7/2008 | Savagaonkar et al. | 711/163 |
| 2009/0007223 A1 | 1/2009 | Centonze et al. | |
| 2009/0251282 A1 | 10/2009 | Fitzgerald et al. | |

(Continued)

FOREIGN PATENT DOCUMENTS

WO    2014/063133 A1    4/2014

OTHER PUBLICATIONS

"Data Execution Prevention", Sep. 30, 2010, Retrieved Online <http://web.archive.org/web/20100930042909/http://technet.microsoft.com/en-us/library/cc738483(WS.10).aspx>, retrieved on Jun. 27, 2014.*

(Continued)

*Primary Examiner* — Jason K. Gee
*Assistant Examiner* — Zhimei Zhu
(74) *Attorney, Agent, or Firm* — Baker Botts L.L.P.

(57) ABSTRACT

Technologies for securing an electronic device include trapping an attempt to access a secured system resource of the electronic device, determining a module associated with the attempt, determining a subsection of the module associated with the attempt, the subsection including a memory location associated with the attempt, accessing a security rule to determine whether to allow the attempted access based on the determination of the module and the determination of the subsection, and handling the attempt based on the security rule. The module includes a plurality of distinct subsections.

30 Claims, 8 Drawing Sheets

(56) References Cited

U.S. PATENT DOCUMENTS

| | | | | |
|---|---|---|---|---|
| 2009/0292522 | A1* | 11/2009 | Maeda | 703/23 |
| 2011/0202999 | A1 | 8/2011 | Logan et al. | |
| 2012/0036569 | A1* | 2/2012 | Cottrell et al. | 726/7 |
| 2012/0254999 | A1 | 10/2012 | Sallam | |
| 2012/0255002 | A1* | 10/2012 | Sallam | 726/23 |
| 2013/0152207 | A1* | 6/2013 | Cui et al. | 726/26 |
| 2013/0254556 | A1* | 9/2013 | Kamei | 713/189 |
| 2014/0156961 | A1* | 6/2014 | Hadley | 711/163 |

OTHER PUBLICATIONS

International Search Report and Written opinion received for PCT Patent Application No. PCT/US2013/065846, mailed on Feb. 14, 2014, 12 pages.

International Preliminary Report on Patentability issued in PCT/US2013/065846, 7 pages, Apr. 21, 2015.

\* cited by examiner

REAL-TIME MODULE PROTECTION

TECHNICAL FIELD

Embodiments of the present invention relate generally to computer security and malware protection and, more particularly, to real-time module protection.

BACKGROUND

Native operating system services can prevent security software from installing arbitrary hooking within the kernel of operating systems. Security software is thus prevented from filtering all behaviors of an electronic device, including potentially malicious actions by malware. Malware may include, but is not limited to, spyware, rootkits, password stealers, sources of spam, sources of phishing attacks, sources of denial-of-service-attacks, viruses, loggers, Trojans, adware, or any other digital content that produces malicious activity.

An operating system's filtering functionality may be limited, and may only be available on timelines decided by the operating system vendor. Malware can operate and reside at the same level as security software, particularly in the operating system kernel and thus compromise both the operating system and the integrity of the security software itself.

Many forms of aggressive kernel mode malware tamper with user mode memory to accomplish malicious tasks such as injecting malicious code dynamically, modifying user mode code subsections to alter execution paths and redirect into malicious code, and modify user mode data structures to defeat security software. Additionally, some malware may attack anti-malware applications and processes from the kernel by tampering with process memory code and data subsections to deceive the detection logic.

Kernel mode rootkits and other malware employ various methods to hide their presence from user mode applications and kernel mode device drivers. The techniques used may vary, depending upon where the infection takes place. For example, malware can attack the kernel active process list of an operating system to delist or unlink a rootkit or other malware process. Other malware may tamper with the code subsections of process access and enumeration functions.

BRIEF DESCRIPTION OF THE DRAWINGS

For a more complete understanding of embodiments of the present invention, and the advantages thereof, reference is now made to the following written description taken in conjunction with the accompanying drawings, in which.

DETAILED DESCRIPTION OF EMBODIMENTS OF THE INVENTION

Figure 1:
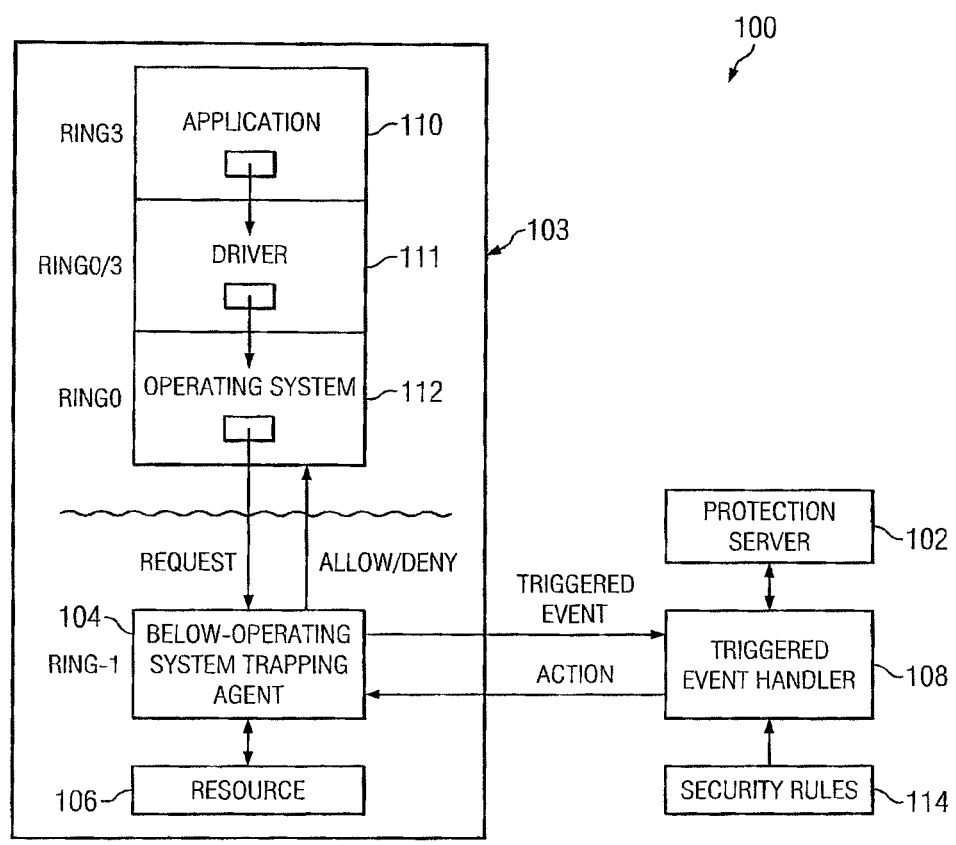
FIG. 1 is an example embodiment of a system for protecting an electronic device from malware.

FIG. 1 is an example embodiment of a system 100 for protecting an electronic device from malware. System 100 may include a below-operating system ("O/S") trapping agent 104 communicatively coupled to a triggered event handler 108. Below-O/S trapping agent 104 may be configured to trap various attempted accesses of a resource 106 of an electronic device 103. Below-O/S trapping agent 104 may be configured to create a triggered event associated with the trapped attempted access, and to send the triggered event to a triggered event handler 108. Triggered event handler 108 may be configured to consult one or more security rules 114 or a protection server 102 to determine how to handle the triggered event. Triggered event handler 108 may also be configured to evaluate the triggered event's propensity to be an indication of malware, or a malicious attempt to subvert the resources or operation of electronic device 103. Furthermore, triggered event handler 108 may be configured to provide a determination to below-O/S trapping agent 104 of whether the triggered event should be allowed or denied, or may be configured to yield another corrective action.

Below-O/S trapping agent 104 may be implemented at a lower functional level than the operating systems in electronic device 103. For example, below-O/S trapping agent 104 may intercept attempted accesses of resource 106 by an operating system 112, a driver 111, or an application 110. Below-O/S trapping agent 104 may be running on a processor of electronic device 103 without use of an operating system. In one embodiment, below-O/S trapping agent 104 may be operating on a bare-metal environment or execution level. In addition, below-O/S trapping agent 104 may be running at a higher execution priority, as defined by a processor of electronic device 103, than all operating systems of electronic device 103. For example, in the context of a hierarchical protection domain model using protection rings, wherein a lower number represents a higher priority, operating system 112 may be operating at "Ring0" while below-O/S trapping agent 104 may be operating at "Ring −1." Drivers 111 and applications 110 may be operating at "Ring0" or "Ring3." In some embodiments of processors, the concept of "Ring −1" may be known as "Ring0 privileged mode," and the concept of "Ring0" may be known as "Ring0 non-privileged mode." Operation in "Ring −1" or "Ring0 privileged mode" may entail more additional overhead and expense than "Ring0" or "Ring0 privileged mode." Operating systems of electronic device 103 may run at Ring0. On processors such as INTEL processors, the mode of "VMX Root" may be equivalent to "Ring0 privileged mode" and the mode of "VMX Non-root" may be equivalent to "Ring0."

Below-O/S trapping agent 104 may operate transparently to entities running at Ring0 or higher. Thus the attempted access of resource 106 may be requested by operating system 112 or another entity in the same manner whether below-O/S trapping agent 104 is present or not. Below-O/S trapping agent 104, when enforcing a received action, may allow the request to happen, may deny the request, or may take other corrective action. To deny the request, below-O/S trapping agent 104 may simply not pass the request to the resource 106 or processor, or may provide a spoofed or dummy reply to the request to convince operating system 112 that the action has occurred.

By running at "Ring −1" at a higher priority than the pertinent operating systems of electronic device 103 or below the pertinent operating systems of electronic device 103, below-O/S trapping agent 104 may avoid much of the malware that plagues operating systems such as operating system 112. Malware may trick operating system 112 or even anti-malware software running at "Ring0," as malware may also be running at "Ring0" priority. However, malware on electronic device 103 must still make requests of resource 106 if it is to carry out malicious activities. Thus, trapping operations linked to sensitive resources may be better accomplished by a trapping agent running below the level of operating systems in electronic device 103.

Below-O/S trapping agent 104 may be implemented in any suitable manner. In one embodiment, below-O/S trapping agent 104 may be implemented in a virtual machine monitor. Such an embodiment may operate below the level of operating systems as described for below-O/S trapping agent 104. Descriptions of an example of such an embodiment may be found in, for example, discussions of FIG. 2, below, of a security virtual machine monitor 216. In another embodiment, below-O/S trapping agent 104 may be implemented in firmware. In yet another embodiment, below-O/S trapping agent 104 may be implemented in microcode. Below-O/S trapping agent 104 may be implemented in any suitable combination of these embodiments.

Triggered event handler 108 may be embodied by one or more event handlers or security agents communicatively coupled together. Triggered event handler 108 and below-O/S trapping agent 104 may be implemented in the same security agent. In one embodiment, triggered event handler 108 may be operating at the same priority ring as below-O/S trapping agent. In another embodiment, triggered event handler 108 may be operating at the same priority as operating system 112, driver 111, or application 110. In yet another embodiment, triggered event handler 108 may be implemented by two or more triggered event handlers wherein at least one triggered event handler operates at the same priority ring as below-O/S trapping agent, and at least one triggered event handler operates at the level of operating system 112, driver 111, or application 110. By running at the level of below-O/S trapping agent 104, triggered event handler 108 may similarly avoid the problems of "Ring0" or "Ring3" malware infecting the agent itself. However, a triggered event handler 108 running at "Ring0" or "Ring3" with operating system 112, driver 111, or application 110 may be able to provide context information about an attempted access of resource 106 that may be unavailable from the viewpoint of "Ring −1" agents.

Triggered event handler 108 may be implemented in any suitable manner. In one embodiment, triggered event handler 108 may be implemented in a virtual machine monitor or virtual machine monitor security agent. Such an embodiment may operate below the level of operating systems. Descriptions of an example of such an embodiment may be found in, for example, discussions of FIG. 2, below, of a security virtual machine monitor 216 or security virtual machine monitor security agent 217. In another embodiment, triggered event handler 108 may be implemented fully or in part in firmware. Such an embodiment may operate below the level of operating systems as described for triggered event handler 108. In yet another embodiment, triggered event handler 108 may be implemented in microcode. Such an implementation may operate below the level of operating systems as described for triggered event handler 108. Triggered event handler 108 may be implemented in a combination of these embodiments.

In one embodiment, triggered event handler 108 may be implemented in a plurality of modules, wherein at least one such module operates at a level below the operating systems, and at least one such module operates at a level within the operating systems. Each such module may be configured to communicate with each other.

In one embodiment, below-operating system trapping agent 104 and/or triggered event handler 108 may operate in a bare metal layer of electronic device 103. Below-operating system trapping agent 104 and/or triggered event handler 108 may operate without use of an operating system between them and the resource 106 that they are configured to protect. Resource 106 may include a processor, features of the processor, memory, the entities residing in the memory such as data structures, or the entities residing in the memory for execution by the processor such as functions, processes, or applications. Resource 106 may include a system resource including a resource of electronic device 103. Furthermore, resource 106 may be designated as secured so as to be protected by the operation of, for example, below-operating system trapping agent 104, triggered event handler 108, or any suitable anti-malware mechanism or module. Thus, resource 106 may include a secured system resource. Below-operating system trapping agent 104 and/or triggered event handler 108 may operate directly on the hardware of electronic device 103. Below-operating system trapping agent 104 and/or triggered event handler 108 may not require the use of an operating system such as operating system 112 to execute or gain full access to resource 106.

Other operating systems may exist on electronic device 103 which do not participate in the relationship between entities at the level operating system 112, below-operating system trapping agent 104 and triggered event handler 108, and resource 106. For example, a pre-boot operating system may securely launch portions of electronic device, but not participate in the normal operation of electronic device in terms of handling requests from application 110, driver 111, and operating system 112 mode of resource 106. In another example, electronic device 103 may contain motherboard components, plug-in cards, peripherals, or other components which contain their own sets of operating systems and processors to perform functions outside of the relationship between entities at the level operating system 112, below-operating system trapping agent 104 and triggered event handler 108, and resource 106. These operating systems may be embedded operating systems. Any of these operating systems might not be used for the execution of below-operating system trapping agent 104 and triggered event handler 108. Further, any of these operating systems might not access the resource 106 protected by trapping agent 104 and triggered event handler 108.

Each of operating system 112, driver 111, or application 110 may be implemented by any suitable module, executable, script, logic, instructions, hardware, software, firmware, or combination thereof to operate on system 100.

System 100 may include any combination of one or more below-operating system trapping agents 104 and one or more triggered event handlers 108. Descriptions of the below-operating system trapping agents 104 and triggered event handlers 108 may be found in descriptions of trapping agents, event handlers, and security agents in the figures that follow.

Resource 106 may include any suitable resource of an electronic device. For example, resource 106 may include registers, memory, controllers, or I/O devices. Descriptions of example embodiments of resource 106 may be found in descriptions of, for example, the system resources 214 of FIG. 2, or the virtualized memory 404 or physical memory 403 of FIG. 4.

Security rules 114 may include any suitable rules, logic, commands, instructions, flags, or other mechanisms for informing below-O/S trapping agent 104 about what actions to trap, or for informing triggered event handler 108 to handle an event based on a trapped action. Triggered event handler 108 may be configured to provide one or more of security rules 114 to below-O/S trapping agent. Descriptions of example embodiments of some or all of security rules 114 may be found, for example, in descriptions of security rules 222 of FIG. 2, or security rules 421 or security rules 408.

Kernel mode and user mode entities such as application 110, driver 111, and operating system 112 of system 100 may be implemented in any suitable manner. Descriptions of example embodiments of application 110, driver 111, and operating system 112 of system 100 may be found in descriptions of, for example, application 210, driver 211 and operating system 212 of FIG. 2, or application 410, driver 411, and operating system 413 of FIG. 4 below.

Electronic device 103 may be implemented in any suitable manner, such as in a computer, a personal data assistant, a phone, mobile device, system-on-a-chip, server, or any other device configurable to interpret and/or execute program instructions and/or process data. Descriptions of example embodiments of electronic device 103 may be found in discussions of, for example, electronic device 204 of FIG. 2, or electronic device 401 in FIG. 4 below.

System 100 may be implemented in any suitable system for trapping attempted access of resources at a level underneath the operating systems of electronic device 103. System 100 may also be implemented in any suitable means for handling the attempted access by consulting security rules to determine whether the attempted access is malicious or not. For example, system 100 may be implemented by the systems and methods 200, 300, 400, 500, 600, 700, and 800 as described in FIGS. 2-8 below.

Figure 2:
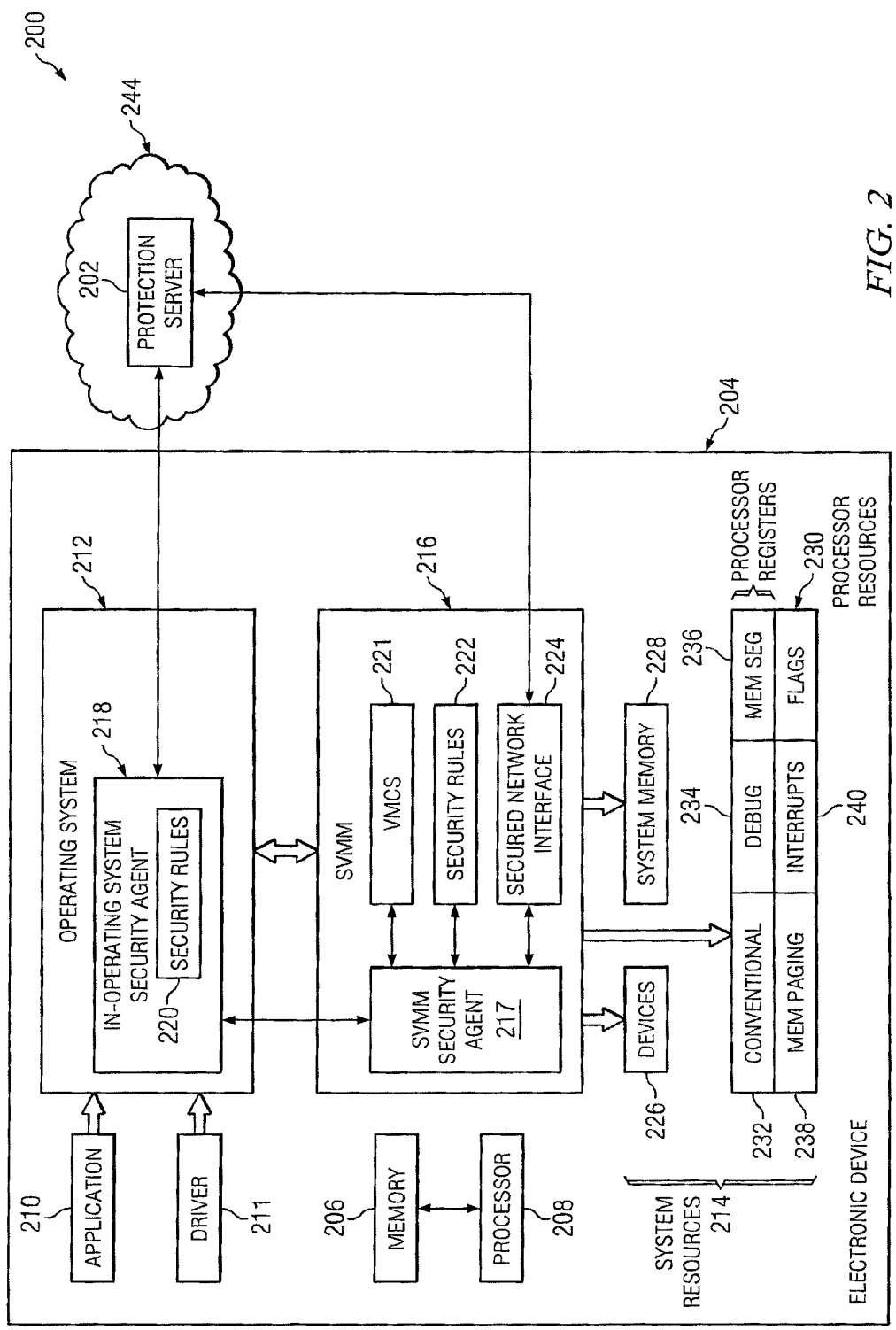
FIG. 2 is an example embodiment of a system for a virtual-machine-monitor-based and security-rule-based configurable security solution for protecting an electronic device from malware.

FIG. 2 is an example embodiment of a system 200 for a virtual-machine-monitor-based and security-rule-based configurable security solution for protecting an electronic device from malware. System 200 may be an example embodiment of a system 100, implementing certain elements of system 100 in a virtual machine monitor. System 200 may include an electronic device 204 which is to be protected against malware by a configurable security solution. The configurable security solution of system 200 may include a security agent running below all operating systems, a security virtual machine monitor, a cloud-based security agent and an in-O/S behavioral security agent. The below-O/S security agent and security virtual machine monitor may be configured to guard access to system resources of the electronic device 204, including the resources used by the in-O/S behavioral security agent. The below-O/S security agent may be running in the security virtual machine monitor. The cloud-based security agent may be configured to provide malware detection information to the below-O/S security agent and to the in-O/S behavioral security agent, and to receive information regarding suspicious behavior possibly associated with malware from the security virtual machine monitor and in-O/S behavioral security agent. The in-O/S behavioral security agent may be configured to scan the electronic device 204 for evidence of malware operating on the electronic device. System 200 may include one or more below-O/S security agents configured to trap attempted use of access to the resources of the electronic device 204, generate a triggered event corresponding to the attempt, consult security rules regarding the triggered event, and take corrective action if necessary regarding the attempt.

In one embodiment, system 200 may include protection server 202 communicatively coupled to one or more in-O/S security agents 218 and a security virtual machine monitor ("SVMM") security agent 217. SVMM security agent 217 may reside in a SVMM 216. SVMM 216 may reside and operate upon electronic device 204. In-O/S security agent 218 and SVMM security agent 217 may be communicatively coupled. Protection server 202, in-O/S security agent 218, SVMM security agent 217 and SVMM 216 may be configured to protect electronic device 204 from infections of malware.

SVMM security agent 217 may be an example embodiment of the triggered event handler 108 of FIG. 1. SVMM 216 may be an example embodiment of the below-O/S trapping agent 104 of FIG. 1.

Electronic device 204 may include a memory 206 coupled to a processor 208. Electronic device 204 may include one or more applications 210 or drivers 211 executing on electronic device for any suitable purpose. Electronic device 204 may include an operating system 212. Operating system 212 may be configured to provide access to system resources 214 of electronic device 204 to applications 210 or drivers 211. SVMM 216 may be configured to intercept such calls of operating system 212 of system resources 214. SVMM 216 and SVMM security agent 217 may operate below the level of operating system 212. For example, SVMM 216 and SVMM security agent 217 may operate directly on processor 208 in a privileged mode such as "Ring −1."

Processor 208 may comprise, for example, a microprocessor, microcontroller, digital signal processor (DSP), application specific integrated circuit (ASIC), or any other digital or analog circuitry configured to interpret and/or execute program instructions and/or process data. In some embodiments, processor 208 may interpret and/or execute program instructions and/or process data stored in memory 206. Memory 206 may be configured in part or whole as application memory, system memory, or both. Memory 206 may include any system, device, or apparatus configured to hold and/or house one or more memory modules. Each memory module may include any system, device or apparatus configured to retain program instructions and/or data for a period of time (e.g., computer-readable storage media). Instructions, logic, or data for configuring the operation of system 200, such as configurations of components such as SVMM 216, SVMM security agent 217, and in-O/S security agent 218 may reside in memory 206 for execution by processor 208.

Processor 208 may execute one or more code instruction(s) to be executed by the one or more cores of the processor. The processor cores may follow a program sequence of instructions indicated by the code instructions. Each code instruction may be processed by one or more decoders of the processor. The decoder may generate as its output a micro operation such as a fixed width micro operation in a predefined format, or may generate other instructions, microinstructions, or control signals which reflect the original code instruction. Processor 208 may also include register renaming logic and scheduling logic, which generally allocate resources and queue the operation corresponding to the convert instruction for execution. After completion of execution of the operations specified by the code instructions, back end logic within processor 208 may retire the instruction. In one embodiment, processor 208 may allow out of order execution but requires in order retirement of instructions. Retirement logic within processor 208 may take a variety of forms as known to those of skill in the art (e.g., re-order buffers or the like). The processor cores of processor 208 are thus transformed during execution of the code, at least in terms of the output generated by the decoder, the hardware registers and tables utilized by the register renaming logic, and any registers modified by the execution logic Protection server 202 may be operating on a network 244. Protection server 202 operating on network 244 may implement a cloud computing scheme. Protection server 202 may be configured to communicate with elements of electronic device 204 to update malware detection rules and information. Protection server 202 may be configured to receive information regarding suspicious activities originating from electronic device 204 and determine whether or not such suspicious activities are indications of malware infection. Operating system 212 may include one or more in-O/S security agents 218. In-O/S security agent 218 may be configured to receive monitoring and detection rules from protection server 202, such as in-O/S security rules 220. In-O/S security agent 218 may be configured to use the in-O/S security rules 220 received by protection server 202 to monitor and prevent suspicious activities on electronic device 204. In-O/S security agent 218 may be configured to report detected suspicious activities back to protection server 202. In-O/S security agent 218 may be configured to prevent malware operations and to report such preventions to protection server 202. If more than one in-O/S security agent 218 is present in system 200, each in-O/S security agent 218 may be configured to perform a designated portion of the trapping, validating, or other tasks associated with in-O/S security agent 218. Such portions may be defined by below-operating-system security agents. For example, one in-O/S security agent 218 may validate or investigate MOV instructions, while another in-O/S security agent 218 may validate or investigate JMP instructions. In-O/S security agent 218 may be configured to determine the life cycle of a particular page in memory. For example, in-O/S security agent 218 may know the processes and steps typically used by operating system 212 to allocate a page of memory. Similarly, in-O/S security agent 218 may know the processes and steps typically used by operating system 212 to load an image of an application in its loader. Such processes may follow a static pattern of operation. Thus, in-O/S security agent 218 may be configured to track the operation of operating system 212 to determine whether for a given action standard procedures were followed. In-O/S security agent 218 may communicate with SVMM security agent 217 to determine whether or not an operation trapped by SVMM security agent 217 generated the corresponding expected actions observed by in-O/S security agent 218. A discrepancy may indicate that malware has attempted to perform a system function outside of the normal operation of the operating system 212. Thus, for example in-O/S security agent 218 and SVMM security agent 217 may determine whether a page in question was loaded in memory directly by malware or was loaded by the operating system loader. Such a behavior may cause in-O/S security agent 218 or SVMM security agent 217 to report information to protection server 202, employ more aggressive trapping and checking, or take any other corrective measures.

In one embodiment, in-O/S security agent 219 may be configured to provide contextual information by embedding itself within operating system 212. For example, in-O/S security agent 219 may be configured to register itself or a sub-component as a driver filter, and attach itself to a main driver to determine what the driver sees or does not see. By attached as a filter to NTFS.SYS, for example, in-O/S security agent 219 may be configured to report the file I/O operations seen by the operating system 212 drivers.

In another embodiment, in-O/S security agent 219 may be configured to provide such information observed from within operating system 219 to SVMM security agent 216 or other below-O/S security agents for comparison with information observed below the operating system. Discrepancies between the two sets of information may indicate a presence of malware attempting to hide itself. For example, in-O/S security agent 219 may hook or filter NDIS.SYS, and monitor for file writes to a particular file. SVMM security agent 216 may monitor input and output commands. If SVMM security agent 216 determined more writes than should have been seen based on the list of function calls seen by in-O/S security agent 219, then malware may be clandestinely writing to disk outside of the functions provided by operating system 212.

Network 244 may be implemented in any suitable network for communication, such as: the Internet, an intranet, wide-area-networks, local-area-networks, back-haul-networks, peer-to-peer-networks, or any combination thereof. Protection server 202 may use the reports submitted from various security agents 218 running on various electronic devices 204 to further detect malware by applying prevalence and reputation analysis logic. For example, a suspicious behavior identified on electronic device 204 may be synthesized into a rule for protection server 202 to proactively protect other electronic devices 204. Such a rule may be determined, for example, based on the number of times that a suspicious driver has been reported. For example, an unknown driver with a narrow or slow distribution pattern may be associated with malware. On the other hand, an unknown driver with a wide and fast distribution may be associated with a patch of a popular and widely available application. In another example, such a detected driver may have been determined by security software running on another electronic device to have accessed a website known to host malware. Such a driver may be determined to be associated with malware.

SVMM 216 may implement some or all of the security virtual machine monitoring functions of system 200. SVMM 216 may be configured to intercept access to system resources—such as registers, memory, or I/O devices—to one or more operating systems running on an electronic device. The security virtual machine monitoring functions of system 200 may be implemented using SVMM 216, or any other virtual machine monitor configured to protect electronic device 204 according to the teachings of this disclosure. SVMM 216 may be configured to control and filter actions taken by operating system 212 while operating system 212 attempts to access system resources 214, on behalf of itself or on behalf of applications 210 running through operating system 212. SVMM 216 may run underneath operating system 212 on electronic device 204 and may have control over some or all processor resources made available to operating system 212 and application 210 or driver 211. Each of application 210 and driver 211 may be implemented by, for example, application 110 and driver 111 of FIG. 1. Application 210 may comprise any application suitable to run on electronic device 204. Driver 211 may comprise any driver suitable to run on electronic device 204. The processor resources made available for control by SVMM 216 may include those resources designated for virtualization. In one embodiment, SVMM 216 may be configured to virtualize system resources 214 for access by operating system 212, application 210, or driver 211. As examples only, such system resources 214 may include input-output devices 226, system memory 228, or processor resources 230. As examples only, processor resources 230 may include conventional registers 232, debug registers 234, memory segmentation 236, memory paging 238, interrupts 240 or flags 242. I/O devices 226 may include access to such devices such as keyboard, display, mice, or network cards. Furthermore, system resources 214 may include specific memory addresses within system memory 228 or specific memory pages within system memory 228. System memory 228 may include physical memory or virtualized memory. Convention registers 232 and debug registers 232 may include data registers or control registers. Processor resources 230 may also include caches, processing cores, exceptions, or specific operation codes or combinations of operation codes.

SVMM 216 may be configured to trap the execution of operations originating from operating system 212 to access system resources 214. SVMM 216 may include a control structure configured to trap specific attempted accesses of system resources 214. Any suitable control structure may be used. In one embodiment, such a control structure may include virtual machine control structure ("VMCS") 221. SVMM 216 may be configured to trap such execution by manipulating flags inside of VMCS 221. SVMM 216 may be configured to trap any suitable operation of operating system 212, application 210, or driver 211 involving an access of system resources 214. Such trapped operations may include, for example: reading, writing and execution of particular pages of memory in system memory 228; loading and storing a value to or from a processor register 230; or reading and writing to or from I/O devices 226. Any such operations may cause a Virtual Machine Exit ("VM Exit"), which may be trapped by SVMM 216. SVMM 216 may be configured to trap the generation of interrupts 240, which may be generated by the processor 208 or initiated by elements of operating system 212. SVMM 216 may be configured to trap the attempted reading and writing to or from I/O device 226 by trapping IN and OUT instructions. SVMM may be configured to trap such instructions by trapping access to mechanisms, for example, of Virtualization Technology Directed I/O ("VTd"). VTd may allow I/O device virtualization according to processor 208. By accessing VTd facilities, SVMM security agent 217 may be configured to determine devices connected by VTd, determine meta-information from operating system 212, ports on the I/O device, or other suitable information. SVMM security agent 217 may be configured to control or trap the operation of such virtualized device access. For example, SVMM security agent 217 may be configured to determine I/O permission maps, containing I/O assignments given to programmable I/O ports. SVMM security agent 217 may be configured to trap access to such permission maps, which may be done by malware, or use such permission maps to determine the relationship of entities on operating system 212 and a request of an I/O device.

In one embodiment, SVMM security agent 217 may be operating in SVMM 216. In another embodiment, SVMM security agent 217 may be operating outside of SVMM 216, but may be communicatively coupled to SVMM 216. In such an embodiment, SVMM security agent 217 may be operating below the level of operating systems of electronic device 204 such as operating system 212. SVMM security agent 217 may be operating at the same level and/or the same priority of SVMM 216. SVMM security agent 217 may be configured to handle events triggered by or trapped by SVMM 216. SVMM security agent 217 may be configured to access contents of memory 228 or a disk at a level below the operating system 212 so as to examine the contents free of interference of kernel-level rootkits. Furthermore, some operations of SVMM security agent 217 may be implemented by SVMM 216, and some operations of SVMM 216 may be implemented by SVMM security agent 217.

SVMM security agent 217 may be configured to set the operation of SVMM 216 in terms of what actions will cause a trap or trigger. In one embodiment, SVMM 216 may be configured to communicate the detection of trapped actions to SVMM security agent 217. SVMM security agent 217 may be configured to consult security rules 222 to determine whether the trapped actions indicate malware or malicious activities, and based upon security rules 222 may provide indications to SVMM 216 about what subsequent action to take. Such subsequent action may include allowing the attempted action, disallowing the attempted action, or taking other corrective steps.

The operation of trapping the attempted access and execution of system resources 214 by SVMM 216 and SVMM security agent 217 may be coordinated through information gathered by in-O/S security agent 218. In-O/S security agent 218 may be configured to provide context to the trapping and handling operations of SVMM 216 and SVMM security agent 217. For example, a particular operating system data structure may normally only be written to by a specific application or service. In-O/S security agent 218 may determine what applications or processes are currently visibly running on operating system 212 and communicate the information to SVMM security agent 217. If the specific application or service is not listed as visibly running, then the attempted write to the data structure may have come from an unauthorized application or process.

In-O/S security agent 218 may be configured to communicate with SVMM 216 and/or SVMM security agent 217 via hypercalls. Hypercalls may be implemented with a descriptor table defining available requests that may be used, as well as associated input and output parameters. Such a descriptor table may define one or more requests possible for in-O/S security agent 218 to communicate with SVMM 216 and/or SVMM security agent 217. Such a descriptor table may also define where input and output parameters for such a request may be located in memory.

In-O/S security agent 218, SVMM security agent 217, and protection server 202 may be configured to authenticate each other. Each of security agent 212, SVMM security agent 217 and protection server 202 may be configured to not continue communications with each other unless each of the entities is authenticated. SVMM 216 may be configured to locate the in-O/S security agent 218 image in memory 206, and use cryptographic signing algorithms to verify the in-O/S security agent 218 image in memory 206. Authentication between protection server 202, in-O/S security agent 218 and SVMM security agent 217 may use any suitable method, including cryptographic hashing and/or signing algorithms. In one embodiment, such authentication may involve the exchange of a private secret key. In-O/S security agent 218 may be configured to receive a secret key from protection server 202 to verify the instance of SVMM security agent 217.

In-O/S security agent 218 may have contextual information regarding the operation of operating system 212. In-O/S security agent 218 may be configured to communicate with SVMM security agent 217 to provide such contextual information. SVMM security agent 217 may instruct SVMM 216 on, for example, how to define certain pages of memory, or which registers to trap.

SVMM 216 may be configured to trap access attempts to system resources 214 defined by SVMM security agent 217. For example, for traps of memory access, SVMM 216 may be configured to trap operations such as read, write or execute. For trapping access to processor registers 230, SVMM 216 may be instructed to trap operations including load, store, or read register values. For trapping I/O operations, I/O devices 226, SVMM 216 may be instructed to trap operations such as input or output to keyboards, mice, or other peripherals. SVMM security agent 217 and/or other below-operating system security agents in the figures below may, in conjunction with in-operating system security agents, may be configured to determine for an I/O operation, the identity of a target I/O device 226, target operation to be performed upon the I/O device 226, and the data to be transferred.

SVMM security agent 217 may be configured to determine contextual information, such as what entity of operating system 212 has attempted to access a resource of electronic device 204, or to what entity of operating system 212 a resource may belong. SVMM security agent 217 may be configured to make such determinations through any suitable method. In one embodiment, SVMM security agent 217 may be configured to access contextual information for such determinations from in-operating system security agent 218. In another embodiment, SVMM security agent 217 may be configured to, directly or indirectly, access a call stack of operating system 212 and/or an execution stack of processor 208 to determine the order of calls made by different processes or applications of operating system 212. An Execution Instruction Pointer may point to the instruction causing the trigger, while an Execution Stack Pointer and Execution Base Pointer may point to the stack frames. By walking the Execution Base Pointer through the stack, previous function calls may be identified providing context for the operation at hand. Such stacks may indicate the operation that was attempted as well as a source memory location. In yet another embodiment, SVMM security agent 217 may be configured to use a memory map in conjunction with security rules 222 to determine whether an attempt is malicious or indicative of malware. Such a memory map may, for example, indicate the entity that made an attempted access of resources, given a memory location of the attempted access. Such a memory map may be defined, for example, in virtual memory page identifiers and/or physical memory addresses. Such a memory map may, in another example, indicate the entity corresponding to the memory location of the target of the attempt. Using the memory map, SVMM security agent 217 may be configured to determine the identities of the source and targets, or entity owners thereof, of an attempted access. The memory map may be created in part by SVMM security agent 217 or other below-O/S security agents in conjunction with in-operating system security agents through monitoring the execution of the system. SVMM security agent 217 and/or other below-operating system security agents may, in conjunction with in-operating system security agents, determine for a given memory page or physical address whether such a location belongs to a particular code subsection or data subsection; to which module, process, application, image, or other entity it belongs; or whether it is associated with user mode or kernel mode entries. SVMM security agent 217 and/or other below-operating system security agents may, in conjunction with in-operating system security agents, determine metadata for the mapping of virtual memory and physical memory indicating the identification, location, and permissions of various entities running on the electronic device 204. Similarly, SVMM security agent 217 and/or other below-operating system security agents may use a mapping of sectors in a mass storage device to determine the location of images of such entities in the mass storage device. SVMM security agent 217 and/or other below-operating system security agents may, in conjunction with in-operating system security agents, determine for a given entity the sectors, files, directories, and volumes on which they reside.

SVMM security agent 217 may be configured to allocate memory such as system memory 228 as required for operation of in-O/S security agent 218, SVMM security agent 217, and SVMM 216. SVMM security agent 217 may be configured to request that SVMM 216 secure such allocated memory against unauthorized read and write operations. SVMM 216 may be configured to initialize the allocated memory after protection of the memory is established to eliminate the opportunity for malware to add malicious code between the time when the memory is allocated by in-O/S security agent 218 and the protection is established by SVMM 216.

SVMM security agent 217 may be configured to communicate with protection server 202 to securely receive SVMM security rules 222. SVMM security rules 222 may comprise instructions, logic, rules, shared libraries, functions, modules, or any other suitable mechanism for instructing SVMM 216 about what security policies to employ. SVMM security agent 217 may be configured to transfer information to protection server 202 regarding suspicious activities and detected malware from electronic device 204.

In-O/S security agent 218 may be configured to communicate with protection server 202 to receive in-O/S security rules 220. In-O/S security rules 220 may comprise instructions, logic, rules, shared libraries, functions, modules, or any other suitable mechanism for in-O/S security agent 218 to detect malware on electronic device 204. In-O/S security agent 218 may be configured to transmit information to protection server 202 regarding suspicious activities and detected malware on electronic device 204.

In-O/S security rules 220 and SVMM security rules 222 may each comprise protection rules for protecting electronic device 204 against malware infections, and for detecting suspicious activities that may comprise malware. In-O/S security agent security rules may contain rules executed by and within in-O/S security agent 218. SVMM security rules 222 may contain rules executed by and within SVMM 216 and/or SVMM security agent 217.

SVMM security rules 222 may be configured to provide information to SVMM security agent 217 with definitions of how to observe and detect malware infections of electronic device 204. For example, SVMM security rules 222 may include categorizations of what types of function calls or behaviors from entities such as application 210 or driver 211 that SVMM security agent 217 may monitor for indications of malware. As another example, SVMM security rules 222 may include definitions of how SVMM security agent 217 may process such triggered function calls, including what parameters to use, how to extract values from such calls, or how to validate the operation of such calls. Furthermore, SVMM security rules 222 may include information for in SVMM security agent 217 on how to monitor the behavior of entities in electronic device such as application 210 or driver 211, as well as exceptions to such behavioral detection rules. As yet another example, SVMM security rules 222 may include information for SVMM security agent 217 on how to prevent and repair malicious behaviors detected by such behavioral detection rules. SVMM security rules 222 may include details of what data that SVMM security agent 217 should monitor, collect, and send to protection server 202.

Similarly, in-O/S security rules 220 may be configured to provide information to in-O/S security agent 218 with definitions of how to observe and detect malware infection of electronic device 204, as well as how to coordinate such activities with SVMM security agent 217.

SVMM security rules 222 may also include rules regarding what actions SVMM 216 will trap. SVMM security agent 217 may be configured to apply such rules to SVMM 216. For example, SVMM security agent 217 may be configured to convert the address for a function to be trapped into an identifiable virtual or physical page of memory, create a request for SVMM 216 to trap the execution of such a page, and subsequently call the security agent 217 after trapping the execution. SVMM security agent 217 may be configured to receive SVMM security rules 222 through its interface with the SVMM 216. Such an interface may comprise a hypercall-based interface. SVMM security agent 217 may be configured to push any resulting detections or reports to SVMM 216 through the same hypercall-based interface.

In one embodiment, SVMM 216 may be configured to process triggered actions without consulting SVMM security agent 217. In such an embodiment, SVMM 216 may be configured to install additional triggers that are processed within SVMM 216 which might not be passed to SVMM security agent 217. Such additional triggers may be defined by SVMM security rules 222. In one embodiment SVMM security rules 222 may define memory pages scanning rules for SVMM 216. Such rules may include a listing of entities or modifications which are malicious and should not be allowed to reside in memory. Such rules may also include a whitelist, configured to include a listing of pages that are specifically allowed to exist within system memory 228. In another embodiment, SVMM security rules 222 may define to the SVMM 216 memory pages access rules. Such rules may include definitions of what code pages are allowed, or conversely, prohibited to access a given code or data page. Consequently, SVMM security rules 222 may be configured to instruct SVMM 216 to act as a memory scanner, and/or control access to memory pages.

SVMM 216 may be configured to protect SVMM security agent 217, SVMM 216, and in-O/S security agent 218 by preventing unauthorized read and write access to their respective code and data pages in system resources 214. For example, if application 210 or driver 211 make a request to a portion of system memory 228, processor registers 230 or I/O devices 226 which would result in affecting the integrity or operation of SVMM security agent 217, SVMM 216, and in-O/S security agent 218, then SVMM 216 may be configured to intercept such an attempted request, and subsequently re-route the request, deny it, or take other appropriate action. In another example, SVMM 216 may be configured to authorize read access for portions of system memory 228, processor registers 230 or I/O devices 226 affecting SVMM security agent 217, SVMM 216, and in-O/S security agent 218 for memory security software applications, such as SVMM security agent 217 itself, or other corresponding or affiliated programs. Such an authorization may be defined within SVMM security rules 222, which may define to SVMM 216 how to handle access to system resources 214 such as system memory 228. In one embodiment, SVMM security rules 222 may include a whitelist of trusted security programs, which may include SVMM security agent 217.

To communicate with protection server 202, SVMM 216 may include a secured network interface 224. Secured network interface 224 may be configured to provide secure access between a network server such as protection server 202 and an element of electronic device 204 such as SVMM 216 or SVMM security agent 217. SVMM 216 may include a logical TCP/IP driver or other communication interface, which may implement secured network interface 224. The protection server 202 may be configured to communicate via secured network interface 224 to instruct SVMM 216 or SVMM security agent 217 to update itself, as well as provide protection rules such as SVMM security rules 222 or in-O/S security rules 220. Protection server 202 may be configured to deliver customized rules for a particular electronic device 204, or a particular SVMM 216. Such customization may include the type of malicious activities that have been reported on electronic device 204, along with other protection mechanisms within electronic device 204 such as an antivirus program, firewall, or other protection mechanism. In one embodiment, protection server 202 may be operated by an administrator of electronic device 204 on, for example, a local network. In such a case, the administrator may set global or personalized policies for handling suspicious behavior that may be implemented by rules received from protection server 202. SVMM 216 may include an update engine that informs SVMM 216 or SVMM security agent 217 how to update itself through a new image delivered securely via protection server 202.

In-O/S security rules 220 and SVMM security rules 222 may each be configured to request that particular or classes of observed actions or operations on electronic device 204 be passed to protection server 202. There, protection server may examine and verify the observations before the action is allowed to proceed on electronic device 204. Protection server 202 may be configured to accept such an action to be examined synchronously or asynchronously. In one embodiment, in-O/S security agent 218 may be configured to pass questionable activities, segments of code or data, or actions to SVMM 216 for verification by protection server 202. For example, in-O/S security agent 218 may detect a suspected instance of malware by detecting an unsigned driver loaded within memory. SVMM 216 may receive the information about the suspicious software from in-O/S security agent 218, and may provide it to protection server 202.

SVMM security rules 222 may be configured to allow or deny access to any suitable system resource of electronic device. Such resources available to be monitored may depend upon the resources exposed by processor 208. For example, in one embodiment SVMM security rules 222 may be configured to allow SVMM 216 to restrict access to system memory 228, I/O devices 226, and interrupts 140. Restricted access to system memory 228 may be accomplished, for example, using EPT or the operating system's page tables. Such a restriction may prevent unauthorized access to I/O devices such as keyboard displays or removable discs. In another embodiment, SVMM security rules 222 may be configured to allow SVMM 216 to restrict access to interrupt descriptor table entries, including entries in processor registers such as interrupt 240. In yet another embodiment, SVMM security rules 222 may be configured to allow SVMM 216 to monitor Extended Page Tables ("EPT"), or any other mechanism handling the mapping of virtual memory (real memory from the perspective of a guest operating system) to host physical memory. Changes to permissions or other access in EPT may trigger an event in a VMCS.

If electronic device 204 contains one or more processors besides processor 208 that support virtualization, SVMM 216 or another instance of SVMM 216 may be configured to intercept attempts to access the virtualized resources of such other processors. If electronic device 204 contains, for example, a quad-processor containing processor 208, the resources of the quad-processor may be protected by SVMM 216. If the one or more other processors do not support virtualization, SVMM 216 might not be able to secure access to their resources. If the one or more other processors support a different virtualization technology from processor 208, SVMM 216 may be configured to secure access to their resources if SVMM 216, but in a different manner than as processor 208 is secured, since the manner in which resources are virtualized may differ.

In operation, protection server may be running on network 244. In-O/S security agent 218 may be running on electronic device 204 to protect electronic device 204 from malware infections, by scanning electronic device 204 for malware, observing the behavior of entities such as application 210 and driver 211 on electronic device 204 for suspicious behavior, and by repairing any such infections that were found. In-O/S security agent 218 may be running at the same priority or level as operating system 212, and may be running in operating system 212. SVMM 216 may be operating on electronic device 204 to protect electronic device 204 from malware infection by trapping the attempted access of system resources of electronic device 204. SVMM security agent 217 may be running on electronic device 204, or another suitable electronic device, to set the trapping operation of SVMM 216 and to handle some or all of the trapped attempted accesses of system resources. SVMM 216 and SVMM security agent 217 may be running below the operating system 212 with a priority of "Ring −1." SVMM security agent 217 may be running on SVMM 216.

Protection server 202 may send security rules, such as SVMM security rules 222 and in-O/S security rules 220, to electronic device 204. Such rules may be received by SVMM security agent 217, which may provide in-O/S security rules 220 to SVMM 216. Such rules may be received by in-O/S security agent 218.

Protection server 202, security agent 218 and SVMM security agent 217 may each authenticate each other. SVMM security agent 217 may locate the image of security agent 218 in memory and use cryptographic signing algorithms to verify the image of security agent 218 resident in memory. Protection server 202 and SVMM security agent 217 may authenticate each other using cryptographic hashing and signing algorithms to correctly identify each other. SVMM security agent 217 and protection server 202 may also exchange a private secret key to authenticate the identity of each other. Security agent 218 may receive a secret key from protection server 202 to verify the instance of SVMM security agent 217. Communication between security agent 218, SVMM security agent 217, and 202 may not be fully established unless each of the agents is authenticated with each other. Similarly, SVMM security agent 217 and SVMM 216 may verify and authenticate each other if they are running as separate entities.

SVMM 216 and SVMM security agent 217 may be running underneath operating system 212 and all operating systems of electronic device 204. SVMM 216 may monitor access to system resources 214, including I/O devices 226, system memory 228, and processor registers 230 by operating system 212, security agent 218, application 210, and driver 211. SVMM 216 may trap the execution of key operations requested by operating system 212, security agent 218, application 210, driver 211, or any other entity of electronic device 204. SVMM 216 may trap such execution by manipulating flags inside of VMCS 221. When VMCS 221 intercepts a request for a protected resource, operation may be handed off to SVMM 216 for further operation, diagnosis and repair. In one embodiment, operation may be subsequently handled by SVMM security agent 217. In another embodiment, handling of the trapped operation may be conducted by SVMM 216 itself. SVMM 216 may trap any necessary operation of electronic device 204 to provide protection against malware. Such operations may include, but are not limited to: reading, writing and execution of particular code or data pages in system memory 228; loading and storing of value from a system register and processor registers 230; or reading to or from I/O devices 226. The specific operations which will be trapped by SVMM 216 may be defined by SVMM security rule 222.

Protection server 202 may communicate with SVMM security agent 217 or in-O/S security agent 218 to provide security rules to each. In one embodiment, protection server 202 may deliver SVMM security rules 222 to SVMM security agent 217. In another embodiment, protection server 202 may deliver in-O/S security rules 220 to in-O/S security agent 218. In yet another embodiment, protection server 202 may deliver in-O/S security rules 220 to SVMM security agent 217, which may then provide the rules to in-O/S security agent 218.

Application 210, driver 211 or other entities operating an electronic device 204 may be observed by in-O/S security agent 218. In-O/S security agent 218 may use in-O/S security rules 220 to observe the behavior of such processing entities to determine whether their behavior constitutes suspicious behavior indicating a possible infection of malware. Upon such a detection of suspicious activities, in-O/S security agent 218 may provide the suspicious information to protection server 202 for further analysis and instruction. In-O/S security rules 220 may indicate to in-O/S security agent 218 that such behaviors are suspicious, as well as indicate corrective action. For example, application 210 may communicate with a network destination which is known to host malware. In-O/S security agent 218 may notice the activity of application 210, and subsequently block the network access of application 210 to the network destination. In-O/S security agent 218 may also scan electronic device 204 for malware. For example, in-O/S security agent 218 may examine the contents of memory 206, or system memory 228 for patterns that correspond to signatures of malware. Such an examination may reveal that, for example, application 210 contains a block of code corresponding to a known segment of malware. In-O/S security agent 218 may then clean electronic device 204 of the infection of malware by repairing application 210, removing application 210, or taking any other suitable action. In-O/S security agent 218 may communicate with protection server 202 regarding any detected suspicious behaviors, or other indications of malware, and may receive instructions from protection server 202 on how to deal with such malware.

In one embodiment, SVMM security agent 217 may be configured to evaluate a trapped operation based on the origin of the entity that made the attempted operation. For example, if a driver was downloaded from an unknown domain, or has a certificate from an unknown guarantor, then the ability of the driver to subsequently operate may be limited. For example, a driver whose status is unknown may be denied the ability to attach itself to another driver. If the driver was downloaded from a domain known to host malware or contains fraudulent credentials, then the driver may not be permitted to even load. Similarly, if a driver is known to be from a particular domain or created by a particular author, then SVMM security agent 217 may be configured to recognize services in electronic device 204 authorized to update the driver, and to limit the ability to write or access the driver to those services. For example, a kernel driver from Company X may only be written to from Company X's update service software resident on electronic device 204. SVMM security agent 217 may be configured to validate the operation and integrity of the update service. In another embodiment, SVMM security agent 217 may be configured to evaluate a trapped operation based on the target of the attempt. For example, an attempt to update software from a service may be trapped for kernel drivers, but not for application software.

Once an entity has been determined to be suspicious, or an attempt determined to indicate malware, the process causing the attempt and the memory housing the process may be linked. Other processes accessing the same portion of memory may similarly be determined to be malware. A trapped attempt to access a resource may be stored, and a subsequent attempt to access a protected resource may be evaluated in light of the original event. For example, a malicious operation may require that code be written to a data segment, then executed. Thus, SVMM security agent 217 may trap the original write access to the data segment, allow the write, but record the source of the write access. Subsequently, SVMM security agent 217 may trap a subsequent attempt to execute the data segment, and evaluate the malicious status of the attempt in light of the previously trapped operation, the entity which attempted it, or other suitable forensic information.

SVMM security agent 217 may instruct SVMM 216 concerning which of system resources 214 that SVMM 216 is to trap through a control structure such as VMCS 221 or through EPT. SVMM 216 may then trap access requests to system resources 214 originating from entities of electronic device 204 such as operating system 212, application 210 or driver 211. For example, if a request is made to read, write or execute portions of system memory 228, SVMM 216 may intercept such a request through a flag set for the designated portion of system memory in VMCS 221 or by intercepting a change detected by EPT. In another example, access requests made of I/O devices 226 may be intercepted by VMCS 221, such as input or output operations. In yet another example, requests of process registers 230, such as load or store commands, may be trapped by VMCS 221. Any such traps may result in the notification of SVMM 216 of the attempted access. Once SVMM 216 has trapped an attempted operation upon system resources 214, SVMM 216 may communicate such a trapped execution to SVMM security agent 217.

In-O/S security agent 218 and SVMM security agent 217 may communicate to determine the context of operations conducted within operating system 212. For example, a trapped system call from operating system 212 to a particular resource of electronic device 204 may have originated from a particular part of memory. SVMM security agent 217 may communicate with in-O/S security agent 218 to determine what application, process, or other entity resides within the particular part of memory.

Based on SVMM security rules 222, and the trapped operation and/or contextual information from in-O/S security agent 218, SVMM security agent 217 may then determine whether such an access constituted a suspicious action such as those indicative of an infection of malware. For example, an attempted change of system memory 228 of a protected memory space by an unauthorized application may be a suspicious activity, and thus such an attempted change detected by SVMM 216 may be interpreted by SVMM security agent 217 to be an operation of malware. Such an activity may be reported to protection server 202 for further instruction, or action may be directed by in-O/S security rules 220. The result of such detection may be to block the attempted change in system memory 228, or to trigger additional cleaning operations upon the entity of electronic device 204 which generated the attempted change.

SVMM 216 may monitor additional calls to system resources 214 to protect the integrity of the SVMM 216, SVMM security agent 217 and/or in-O/S security agent 218. SVMM 216 may conduct scanning operations, defined by SVMM security rules 222, to scan portions of system memory 228 to determine whether portions of such memory have been modified by malware. SVMM 216 may make use of signatures, hashes, or other rules indicating that a given pattern of memory is known as unsafe or safe.

For example, SVMM 216 may protect in-O/S security agent 218 by preventing unauthorized read and write access to code and data pages corresponding to in-O/S security agent 218 in system memory 228. Some malware may attempt to attack in-O/S security agent 218 by making memory modifications or other modifications to system resources 214 associated with system memory 228. SVMM 216 may read a whitelist contained in SVMM security rules 222 of authorized applications and other entities of electronic device 204 that may be permitted to alter the code or data or other system resources 214 corresponding to in-O/S security agent 218. If a modification originates from an entity not contained within the whitelist, then SVMM 216 may determine that such a modification is associated with malware. Unauthorized access to system resources 214 corresponding to in-O/S security agent 218 may be handled by SVMM in any suitable manner, including blocking access, creating a honeypot process, reporting violations to protection server 202, or any other suitable remedy.

SVMM 216 may also trap access to system resources 214 belonging to other entities of electronic device 204. For example, a target memory page in system memory 228 may contain sample code or data belonging to a part of the kernel operation of operating system 212. SVMM 216 and SVMM security rules 222 may limit access to such a target page to only code subsections that are authorized. Consequently, if a code page in system memory 228 attempts to read or alter the target memory page, and the code page belongs to a non-authorized entity of electronic device 204, such an access may be blocked by SVMM 216. Thus, SVMM 216 may act to control access to memory pages in system memory 228.

SVMM security agent 217 may be able to update SVMM security rules 222 or in-O/S security rules 220 by contacting protection server 202 for updated rules. Protection server 202 may configure the rules to be delivered to SVMM security agent 217 based upon the particular malware observed, administrator settings, or other characteristics of electronic device 204. SVMM security agent 217 may update the rules of electronic device 204 upon demand by a user, periodically, or upon the occurrence of a significant event, such as the encounter of new suspicious activities that may be linked to malware.

SVMM security agent 217 may set flags in VMCS corresponding to compound conditions. Such flags may span across different types of resources to be trapped. For example, VMCS may be configured to trap the combination of a write of a certain value to page in memory, and a subsequent move of the page to a buffer of an I/O device.

System 200 may contain one or more advantages over other implementations of anti-malware systems and software. For example, some anti-malware solutions may hook various portions of an operating system to trap and evaluate low-level operations of the applications. However, these solutions themselves may operate inside of the operating system, or in another operating system in the case of two guest operating systems. By operating within the confines of the operating system, even at a kernel-level priority, the anti-malware solution may be susceptible to malware attacks from malware also running on the same operating system, perhaps running at the same priority. If trapping or triggering upon certain events is conducted at the level of an operating system, such trapping or triggering may be phished, hooked, reverse engineered, compromised, or otherwise defeated by malware running at the same or lower priority for the operating system. For example, an anti-malware solution running on an operating system that detects and removes a malicious hook in the operating system may be observed by malware running at the same priority. In another example, an anti-malware solution registering as a filter driver to detect the operation of a certain routine may be defeated by malware that registers a malicious filter driver lower on the driver stack than the anti-malware solution. Similarly, if handling of certain trapped or triggered events occurs at the level of an operating system, malware may be able to affect such handling. For example, the malware may undo the corrections of the anti-malware solution, or even disable the operation of the anti-malware solution.

In another example, hypervisors may work to virtualize access to system resources such as system memory 228, but may not conditionally guard access to the system resources and thus act as a security hypervisor. Such hypervisors may not have access to anti-malware rules, such as behavioral rules in security rules 222, to identify malicious activities, entities, or malicious attempted access of system resources. Such hypervisors may be running within an operating system themselves, which may be prone to malware running at the same priority level as the operating system. Such hypervisors may not be running in a "Ring0 privileged mode," because such a mode may require the hypervisor to intercept too many attempted accesses of system resources. The hypervisor may be tasked with virtualizing all aspects of a guest operating system, and the demands of such virtualization may be too expensive to simultaneously access security rules to check for malicious behavior.

Modules may include, for example, logic, instructions, code, software, firmware, hardware, or any suitable combination thereof.

Figure 3:
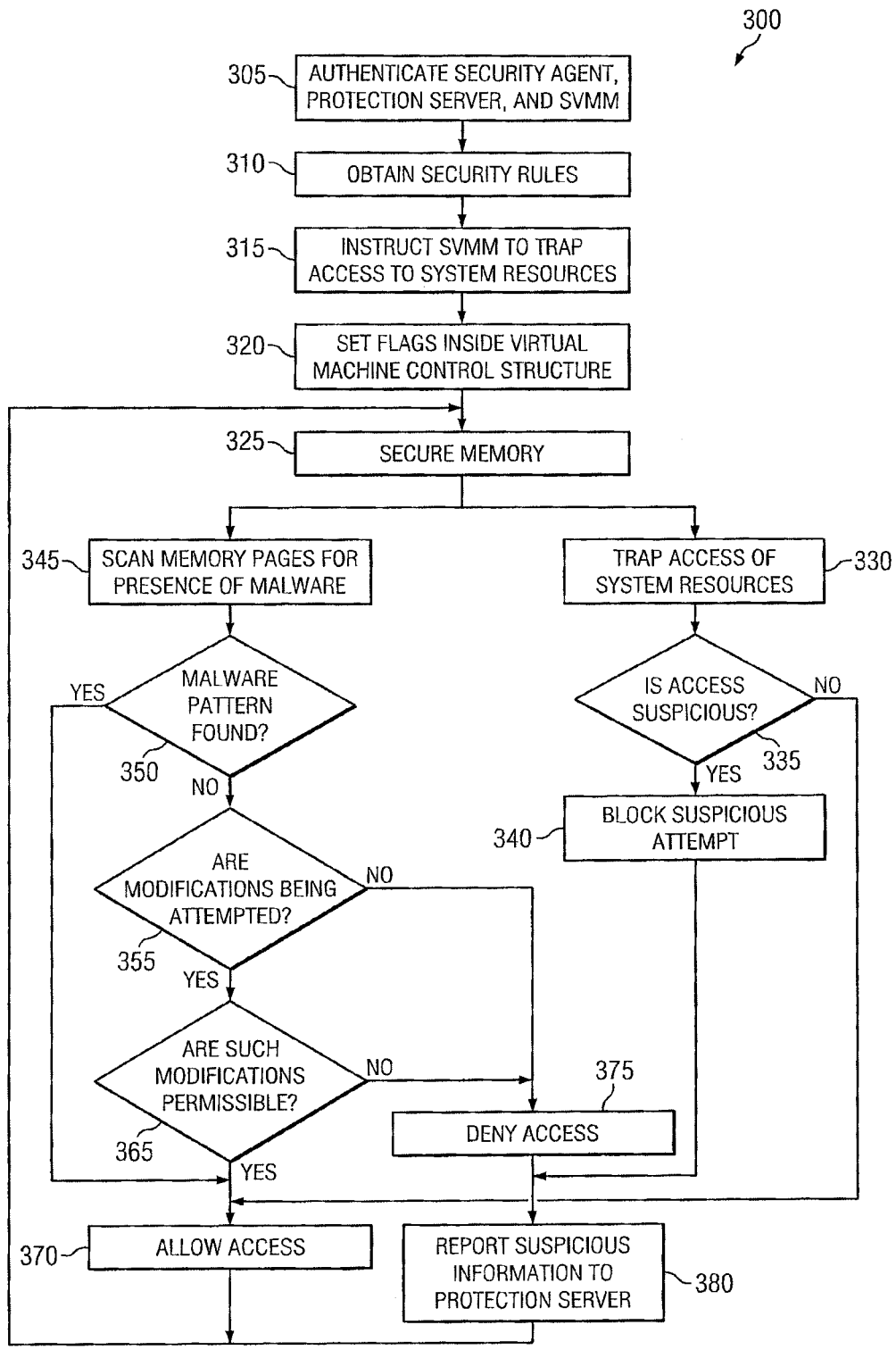
FIG. 3 is an example embodiment of a method for virtual machine-monitor-based protection for an electronic device from malware.

FIG. 3 is an example embodiment of a method 300 for virtual machine monitor-based protection for an electronic device from malware. In step 305, the identity and security of a below-O/S security agent, in-O/S security agent, protection server, and virtual machine monitor may be authenticated. Such authentication may be done through any suitable method, including by locating and verifying the images of each located in memory, cryptographic hashing, or secret keys. Until step 305 is completed, operation of other steps may be withheld.

In step 310, a protection server may be accessed to determine security rules. Such security rules may be used to make decisions in steps 315-380. In step 315, the virtual machine monitor may be instructed to trap access to system resources. Such access may arise from applications, drivers, or operating systems running on the electronic device. The virtual machine monitor may be instructed as to what system resources of the electronic device are to be monitored. The virtual machine monitor may also be instructed as to what operations on the monitored system resources are to be trapped. For example, read, write or execute operations on system memory may be trapped. In another example, load or store operations on registers may be trapped. In yet another example, input or output actions on I/O devices may be trapped.

In step 320, flags corresponding to such operations to be trapped may be set inside a control structure such as a virtual machine control structure. Such trapped operations may generate a VM exit, wherein a triggered event is created upon the access of the flagged resource. In step 325, as system memory is allocated for the virtual machine monitor, the in-O/S security agent, and the below-O/S security agent, such memory may be secured against unauthorized read and write operations.

The electronic device may operate and be protected by one or more of the trapping of access of system resources in steps 330-340, scanning memory for the presence of malware in steps 345-355, and scanning memory for attempted memory modifications in steps 360-365. Each of trapping the access of system resources, scanning memory for the presence of malware, and scanning memory for attempted memory modifications may be conducted in parallel. Further, each of these may be repeated as necessary to protect the operation of the electronic device.

In step 330, the access of a system resource such as system memory, registers, or I/O devices may be trapped. The access may be trapped using a VMCS flag generating a VM exit. Such trapping may be conducted below the level of operating systems running on the electronic device. In step 335, the access may be analyzed to determine whether the requesting entity has permission to access the requested resource. Contextual information associated with the attempted access may be accessed to make such a determination. Security rules may be accessed to make such a determination. An unauthorized access may be determined to be suspicious. Such handling and determinations may be made below the level of operating systems running on the electronic device. If the access is suspicious, then in step 340, a suspicious attempted access of the system resources may be blocked. Such an attempt may be reported to the protection server. If the access is not suspicious, then the access may be allowed in step 370.

In step 345, memory pages of the electronic device may be scanned for the presence of malware. While scanning the memory of electronic device, a whitelist may be used to determine whether patterns of memory, reflecting entities resident on electronic device, are known to be safe. If a pattern of memory known to be safe is encountered, then in step 370, the memory may be allowed to continue to have access to electronic device and may remain. While scanning the memory of electronic device, a blacklist may be used to determine whether patterns of memory are known to comprise or be associated with malware. The whitelist and blacklist may be accessed by accessing the security rules. In step 350, if a pattern of memory known to be associated with malware is found, then in step 375 the pattern of memory may be denied access to electronic device by being repaired, removed, or neutralized.

In step 355, memory may be scanned to determine whether modifications to memory have been or are being attempted. Such scanning may be conducted below the level of operating systems in the electronic device. Such memory may include kernel memory, system data structures, or any other portion of memory of the electronic device that may be modified by malware. For example, a list of active threads running on the electronic device may be modified to hide the presence of a malicious process. If a modification is detected, then in step 365 it may be determined whether such modifications are permissible. Whether such modifications are permissible may be defined by the security rules. For example, the code or data page of an anti-malware process may be protected against modification or access by any other process. If the memory modification is deemed as authorized, then in step 370, the modification may be allowed. If the memory modification is determined to be unauthorized and not allowed, then in step 375, the modification may be denied.

In step 370, if an access or modification is allowed, then the access or modification may be stored for later reference. Some detections of malware may utilize information regarding past accesses or modifications to determine whether such past access and a presently detected access together comprise a malicious access of a resource.

In step 375, if a modification, access, or other operation is denied, then such an event may be reported to the protection server in step 380. Such a report may include information regarding any associated malware or suspicious behavior.

The steps of method 300 may be repeated as necessary to protect the electronic device continuously, periodically, or upon demand.

Figure 4:
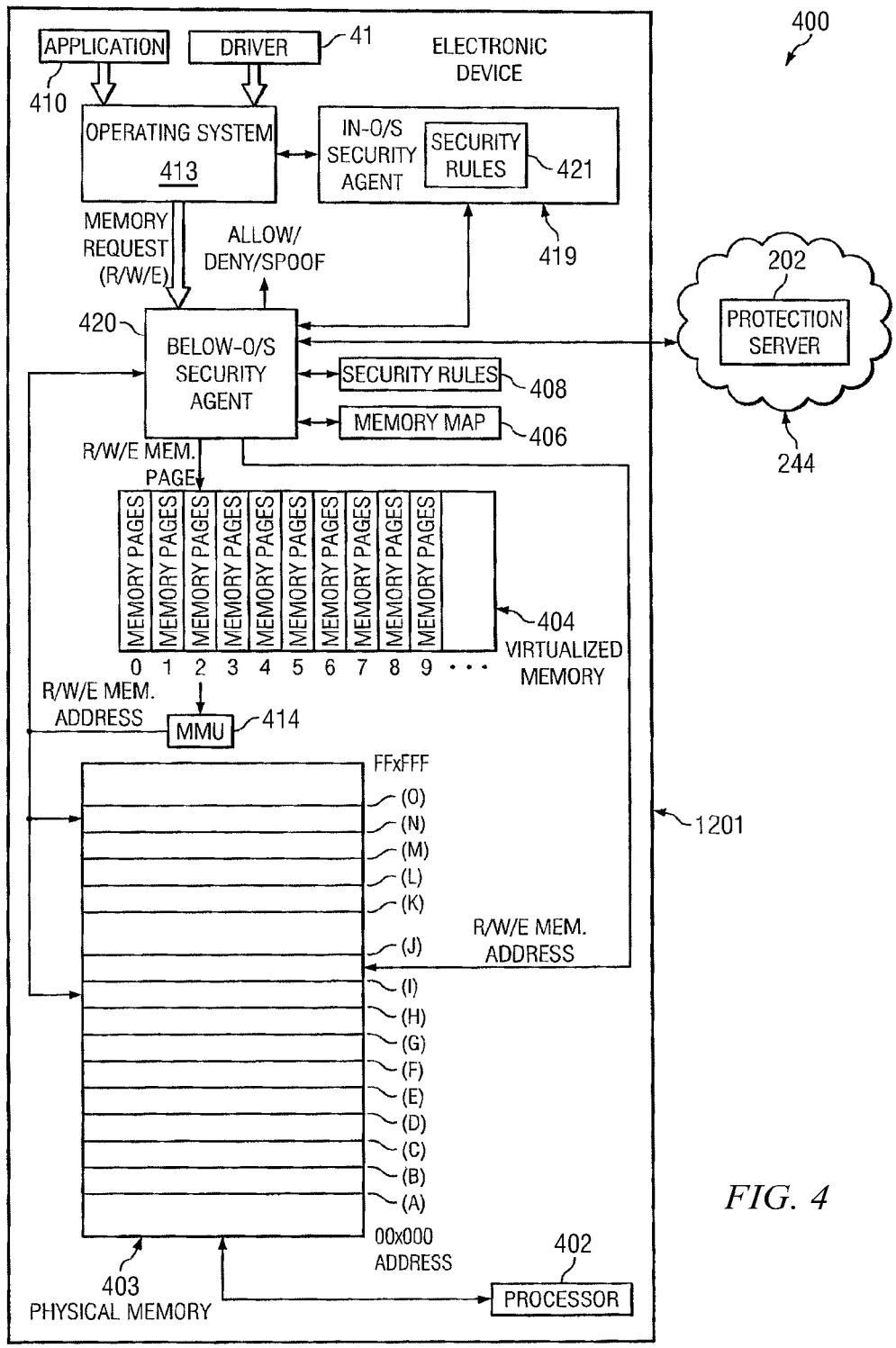
FIG. 4 an example embodiment of a system for regulating software access for securing memory using below-operating system trapping on an electronic device.

FIG. 4 is an example embodiment of a system 400 for regulating software access for securing memory using below-operating system trapping on an electronic device 401. System 400 may include a below-O/S security agent 420 configured to operate on electronic device 401 to detect malicious attempts to access memory from software-based entities running in operating systems of electronic device 401, such as operating system 413. Furthermore, below-O/S security agent 420 may be configured to use one or more security rules 408 and a memory map 406 to determine what attempted accesses of memory to trap and how to handle a triggered event created corresponding to the trapped operation. Below-O/S security agent 420 may be configured to allow, deny, or take other corrective action for the triggered event.

Electronic device 401 may be implemented wholly or in part by or configured to implement the functionality of the electronic device 103 of FIG. 1 or electronic device 204 of FIG. 2 and/or any combination thereof. Electronic device 401 may include one or more processors 402 coupled to a memory such as physical memory 403. Processor 402 may be implemented wholly or in part by or configured to implement the functionality of processor 208 of FIG. 2. Physical memory 403 may be implemented wholly or in part by or configured to implement the functionality of memory 206 of FIG. 2. Electronic device 401 may include an operating system 413, which may include an in-O/S security agent 419 coupled to one or more security rules 421. Operating system 413 may be implemented wholly or in part by or configured to implement the functionality of operating system 112 of FIG. 1 or operating system 212 of FIG. 2. In-O/S security agent 419 may be implemented in part by or configured to partially implement the functionality of in-O/S security agent 218 of FIG. 1 or SVMM security agent 217 of FIG. 2 and/or any combination thereof.

Below-O/S security agent 420 may be wholly or partially implemented by or configured to implement the functionality of below-O/S trapping agent 104 or triggered event handler 108 of FIG. 1, SVMM 216 or SVMM security agent 217 of FIG. 2, and/or any combination thereof.

Security rules 408 may be implemented by or configured to implement the functionality of security rules 114 of FIG. 1, security rules 222 of FIG. 2, and/or any combination thereof. Security rules 421 may be implemented by or configured to implement the functionality of security rules 220 of FIG. 2.

Below-O/S security 420 may be configured to intercept access to memory of electronic device 401. Such memory may include, for example, attempted access of addresses of physical memory 403 or attempted access of pages of virtualized memory 404. Such an attempted access may originate from operating system 413 or entities utilizing operating system 413 to run on electronic device 401, such as application 410 or driver 411.

In one embodiment, memory secured by below-O/S security 420 may include virtualized memory 404. Virtualized memory 404 may include memory available to entities, such as operating system 413, application 410, or driver 411, that have been abstracted from physical memory and/or storage. Virtualized memory 404 may appear as a contiguous block of memory to entities such as operating system 413, application 410, or driver 411, although the actual spaces used may be spread disparately across actual physical memory, such as physical memory 403, and/or in storage such as on a disk. Virtualized memory 404 may be virtualized according to extensions of processor 402. The address space of virtualized memory 404 may be divided into memory pages. The memory pages may be each of equal size, such as four kilobytes. Electronic device 401 may be configured to use page tables to translate the virtual addresses of virtualized memory 404 into physical addresses of memory such as physical memory 403 or addresses of storage. Electronic device 401 may include a memory management unit 414 ("MMU") configured to translate virtual addresses of virtual memory 404 into physical addresses of memory such as physical memory 403 and/or into addresses of a storage. The pages of virtual memory 404 may be indexed. An attempted access of virtual memory 404 pages may include an attempted read, write, or execution of the page, and below-O/S security agent 420 may be configured to trap the attempt. In one embodiment, a page of virtual memory 404 may correspond to a physical memory address or an address of storage. In another embodiment, each page of virtual memory 404 may correspond to a physical memory address. In yet another embodiment, pages containing certain contents such as specific portions of operating system 413 may be pinned and may not change during the operation of electronic device 401.

In another embodiment, memory secured by below-O/S security agent 420 may include physical memory 403. Physical memory 403 may be accessed through addresses of the physical memory, as shown by markers (A), (B), (C), (D), (E), (F), (G), (H), (I), (J), and (K), which denote specific addresses in physical memory 403 that may be the base address of a memory range containing a defined element. Physical memory 403 may be accessed through an attempted read, write, or execution of a specific memory address, and below-O/S security agent 420 may be configured to trap the attempt. For example, an attempted write may take the form of an instruction "MOV Addr1, Value" wherein a value represented by the variable "Value" is written to a specific memory address represented by "Addr1." Any instruction writing to a physical memory 403 address may be used. An attempted read may take the form of an instruction such as "MOV Value, Addr1" wherein a value represented by the variable "Value" is read from a specific memory address represented by "Addr1." Any instruction reading from a physical memory 403 address may be used. An attempted execution may take the form of an instruction at a given address such as "Addr1." Any instruction for executing an address in memory may be used.

Below-O/S security agent 420 may be configured to intercept attempted access to virtual memory 404. Furthermore, below-O/S security agent 420 may be configured to intercept attempted access to physical memory 403. In one embodiment, a request for virtual memory 404 may not be intercepted, but a subsequent corresponding attempted access of physical memory 403 after MMU has translated the virtual memory 404 page to a physical memory 403 address, below-O/S security agent 420 may be configured to intercept the attempted access to physical memory. In another embodiment, an attempted access may be made directly of physical memory 403 without being translated through virtual memory 404, and below-O/S security agent 420 may be configured to intercept the attempted access. In still yet another embodiment, an attempted access made to virtual memory 404 may be intercepted, but below-O/S security agent 420 may not be configured to intercept a subsequent access of a physical memory 403 address.

Below-O/S security agent 420 may be communicatively coupled to in-O/S security agent 419. Below-O/S security agent 420 may be configured to receive contextual information about an attempted access of memory of electronic device 401 from in-O/S security agent 419. The contextual information provided by in-O/S security agent 419 may include the identity of entities that have attempted a particular access of memory of electronic device 401.

Below-O/S security agent 420 may be communicatively coupled to or include a memory map 406. Memory map 406 may be implemented in a file, record, data structure, or other suitable entity. Memory map 406 may include information regarding the location of various entities of electronic device 401 in memory. For example, if a process is loaded in memory of electronic device 401 for execution, memory map 406 may include information regarding which memory pages in virtualized memory 404 or address ranges in physical memory 403 contain the process. Depending upon the implementation of virtualization of memory in electronic device 401, all of the contents of the process may or may not be loaded in physical memory 403, as some contents may be loaded in storage such as a disk. For such contents to be accessed, they may be loaded into physical memory 403. In such a case, memory map 406 may contain information about addresses where the contents are stored, whether in physical memory 403 or in a storage such as a disk. Below-O/S security agent 420 may be configured to use memory map 406 to determine the identity or the owner of any given content in a virtual memory 404 page or a physical memory 403 address. Below-O/S security agent 420 may build memory map 406 by, for example, profiling the operation of the operating system 413, and then determining where in memory various sensitive components are located. As attempts to access memory are made—such as loading the operating system 413 kernel, or executing kernel mode instructions—below-O/S security agent 420 may be configured to communicate with in-O/S security agent 419 to determine what portion of operating system 413 is loading or being executed. In another example, below-O/S security agent 420 may be configured to determine a hash or digital signature of the contents of a memory range of such a virtual memory 404 page. The hash or digital signature may be compared against known values, which may be contained in security rules 408 or obtained from protection server 202. The known values may be the result of a previous characterization, in which portions of, for example, operating system 413 have been identified. Elements to be mapped may be determined by security rules 408. Below-O/S security agent 420 may be configured to track the movement of elements in memory map 406 as the elements are copied from one place to another in the memory of electronic device 401.

Figure 5:
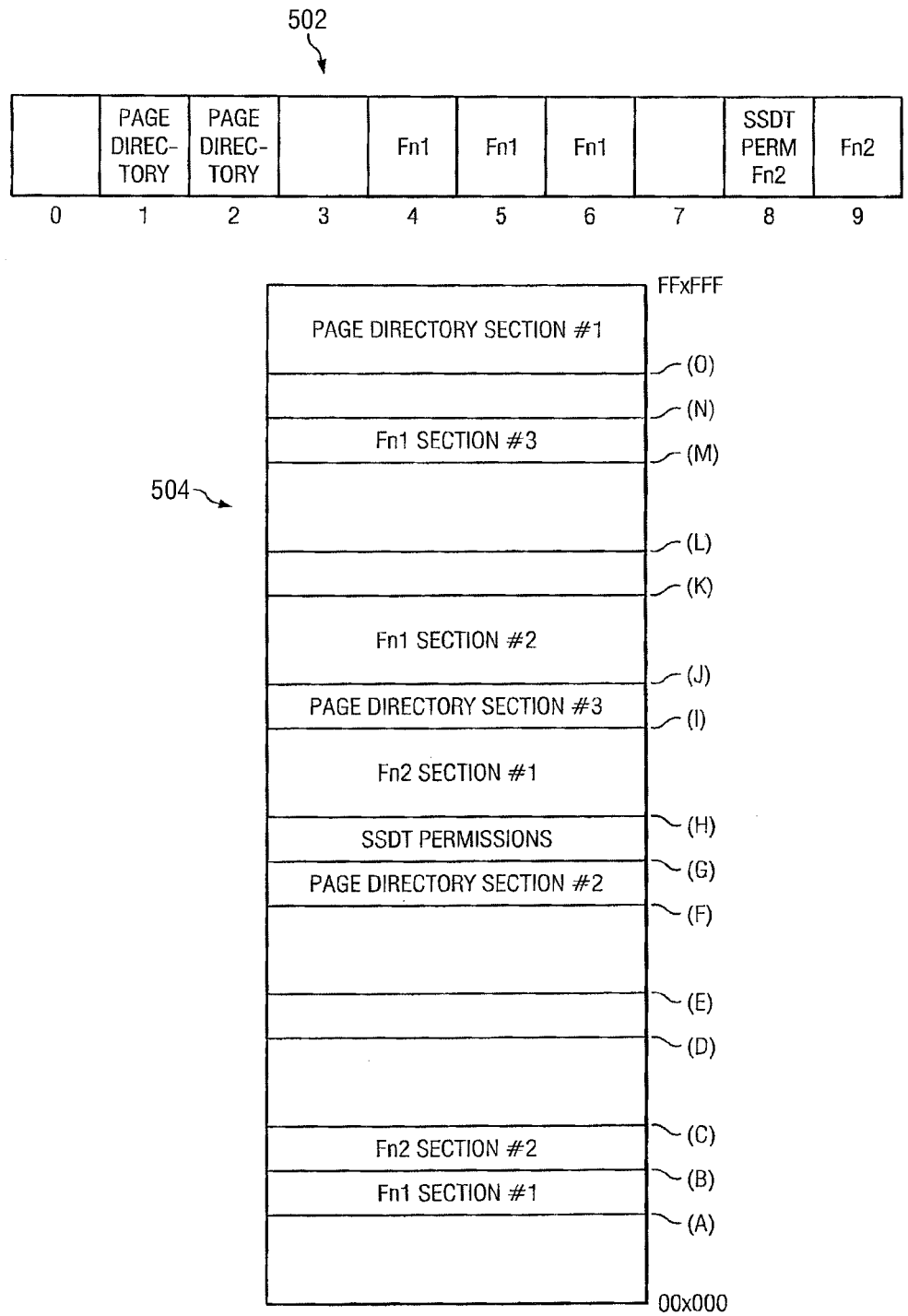
FIG. 5 is an illustration of example embodiments of memory maps.

FIG. 5 is an illustration of example embodiments of memory maps. In one embodiment, virtual memory map 502 may include a mapping of elements to be tracked through their position in virtual memory. In another embodiment, physical memory map 504 may include a mapping of elements to be tracked through their position in physical memory. In various embodiments, virtual memory map 502 and physical memory map 504 may be mapped together so that an element may be tracked in both mappings.

Virtual memory map 502 may reflect ten different virtual memory pages. Virtual memory map 502 may illustrate, for example, that a kernel operating system data structure such a page directory may be found in memory page one and memory page two. In another example, the elements of a particular process, function, or routine called "Fn1," may be found in memory pages four through six. In yet another example, data structures for permissions for a system service dispatch table ("SSDT") may be found in page eight. In still yet another example, elements of a particular process, function or routine called "Fn2" may be found in memory page eight and memory page nine.

Physical memory map 504 may reflect the location of elements with physical memory. Portions of elements in physical memory may be spread across the memory in non-contiguous segments or blocks. Furthermore, portions of elements in physical memory may be spread across the memory in arbitrary order. The size of each segment may vary. The segment may begin at an address offset from the base address. The example base address shown in FIG. 5 is 00x000, terminating at address FFxFFF. Addresses denoting the start of various segments of the physical memory are denoted (A)-(O). For elements that are contained within multiple segments of the physical memory, the order of the elements may be noted. In physical memory multiple segments of an element may be linked together by pointers where the end of one segment of an element may point to the next segment of the element.

For example, Fn1 may be mapped to the segments between (A) and (B), (J) and (K), and (M) and (N). In another example, SSDT permissions may be mapped to the segment between (G) and (H). In yet another example, the page directory data structure may be mapped to the segments between (O) and FFxFFF, (F) and (G), and (I) and (J). In still yet another example, Fn2 may be mapped to the segments between (H) and (I), and (B) and (C).

Returning to FIG. 4, below-O/S security agent 420 may be configured to consult security rules 408 to determine what portions of memory to protect, and how to protect them. For example, security rules 408 may be configured to indicate that the page directory data structure may only be written to by certain privileged entities of electronic device 401. Thus, attempts to write to the page directory data structure may be trapped, and elements attempting the write may be examined to determine whether they are safe, unknown, or known to be unsafe. Below-O/S security agent 420 may be configured to consult memory map 406 to determine where the page directory data structure is located in memory. If below-O/S security agent 420 is implemented, for example, fully or in part in a virtual machine monitor, below-O/S security agent 420 may be configured to set a flag in a control structure to trap any attempted write to memory pages 1 and/or 2 of virtual memory 404. If below-O/S security agent 420 is implemented, in another example, fully or in part in microcode, below-O/S security agent 420 may be configured to set a flag in a control structure to trap any attempted write to memory addresses within the address ranges between addresses (O) and FFxFFF, (F) and (G), and (I) and (J) of physical memory 403.

In another example, security rules 408 may be configured to indicate that Fn1 may only be called by certain privileged entities of electronic device. Thus, attempts to execute Fn1 may be trapped, and elements calling Fn1 may be examined to determine whether they are safe, unknown, or known to be unsafe. Below-O/S security agent 420 may be configured to consult memory map 406 to determine where Fn1 resides in memory. If below-O/S security agent 420 is implemented, for example, fully or in part in a virtual machine monitor, below-O/S security agent 420 may be configured to set a flag in a control structure to trap an attempted execution of memory pages 4, 5, and/or 6 of virtual memory 404. If below-O/S security agent 420 is implemented, in another example, fully or in part in microcode, below-O/S security agent 420 may be configured to set a flag in a control structure to trap any attempted execution of memory address (A) of physical memory 403. In some cases, wherein different portions of Fn1 may be separately executed, below-O/S security agent 420 may be configured to trap attempted execution of any memory address within the ranges between (A) and (B), (M) and (N), the addresses (O) and FFxFFF, (F) and (G), (J) and (K), or (I) and (J) of physical memory 403.

In one embodiment, below-O/S security agent 420 may be configured to consult in-O/S security agent 419 to determine what entity has made the call to write to memory, which is then used to determine whether the entity is authorized or not to make the write. In another embodiment, below-O/S security agent 420 may be configured to determine the memory page of virtualized memory 404 from which the request came and consult memory map 406 to determine whether such a memory page is associated with any elements mapped therein. In yet another embodiment, below-O/S security agent 420 may be configured to determine a hash or signature of a memory page of the requesting element and compare it against hashes and signatures of known entities.

If below-O/S security agent 420 is implemented fully or in part by microcode, below-O/S security agent 420 may be configured to determine the address of the instruction which attempted the write. In one embodiment, below-O/S security agent 420 may be configured to make such a determination by examining an instruction pointer to determine where in physical memory 403 the instruction was made. In another embodiment, by accessing memory map 406, below-O/S security agent 420 may be configured to determine an element from the memory map 406 associated with the address. In yet another embodiment, below-O/S security agent 420 may be configured to determine a hash or signature of the requesting element and compare it against hashes and signatures of known entities.

Once an attempted access of memory has been trapped, below-O/S security agent 420 may be configured to access security rules 408 to determine how to handle the trapped attempt based on the identified requesting entity. Security rules 408 may define that, for example, only certain specified kernel portions of operating system 413 may call and execute Fn1, or only entities known to be safe and on a whitelist may write to the permissions of the SSDT. Below-O/S security agent 420 may then be configured to take any appropriate action, such as allowing the request to proceed, denying the request, spoofing a response or written value, or executing a corrective process.

In operation, below-O/S security agent 420 may be running below the level of operating systems of electronic device 401 such as operating system 413. Below-O/S security agent 420 may access security rules 408 to determine what memory resources of electronic device 401 to protect. Below-O/S security agent 420 may determine, develop, and/or populate the contents of memory map 406. To do so, below-O/S security agent 420 may access security rules 408, protection server 202, or any other suitable source of information for populating information in memory map 406. Below-O/S security agent 420 may intercept requests of physical memory 403 or virtual memory 404 from entities at the operating system level, such as operating system 413, application 410, or driver 411, to map the ownership and contents of memory in memory map 406. Below-O/S security agent 420 may access in-O/S security agent 419 to determine what entities are being loaded into memory so that memory map 406 may be populated. Memory map 406 may contain memory mapping for physical memory 403, virtual memory 404, and/or mappings between the two.

Below-O/S security agent 420 may consult security rules 408 to determine what portions of virtual memory 404 and/or physical memory 403 to protect. Security rules 408 may specify that some portions of memory are to be secured on a dynamic basis, wherein protection for the memory may be enabled or disabled by below-O/S security agent 420 depending upon a variety of considerations. Such considerations may include, for example, administrator settings, detection of malicious or suspicious behavior, time, previously detected accesses of memory, or any other suitable criteria. If protecting memory of electronic device 401 is expensive in terms of computational resources, such dynamic enabling and disabling may allow below-O/S security agent 420 to better secure critical portions of the memory of electronic device 401 while lessening side effects on the ability of electronic device 401 to carry out other tasks. For example, memory containing the contents of the kernel code of operating system 413 may always be protected by below-O/S security agent 420, while the memory containing the contents of the code of a third-party application 410 may be protected only upon other indications that malware is present or may affect the third-party application 410.

Below-O/S security agent 420 may set a flag in a control structure to trap attempted access of physical memory 403 and/or virtual memory 404. In one embodiment, as a request is made from an entity in operating system 413 for a memory page in virtual memory 404 designated to be trapped, below-O/S security agent 420 may intercept the attempted request. In another embodiment, as a request is made for a memory page in virtual memory 404, below-O/S security agent may allow the request to be translated by MMU 414 into a request for an address in physical memory 403, whereupon below-O/S security agent may intercept the attempted request. In yet another embodiment, as a request from an entity in operating system 413 may be made for an address in physical memory 403 directly, below-O/S security agent 420 may intercept the attempted request.

Once a request has been intercepted, below-O/S security agent 420 may use any suitable mechanism to evaluate the intercepted request of memory. Security rules 408 may be used to determine whether the attempt is suspicious, indicating a malicious attempt by malware to use the resources of electronic device 401. Security rules 408 may include considerations of, for example, whether a read, write, or execution was attempted; what entity made the attempt; the memory address or page that was accessed; previous attempts or actions by the same requestor; security settings by an administrator of electronic device 401, such as rules that are more or less restrictive based upon the user of electronic device 401; or the identity of the requestor, as determined by memory location and/or digital signature or hash, or upon related pages or memory addresses.

For example, an attempted write of the page directory data structure in page 2 of virtual memory 404 or at address (J) of physical memory 403 may be intercepted by below-O/S security agent 420. If the write has come from a portion of memory of a process that is unknown, the write may be determined to be suspicious by below-O/S security agent 420. However, if the attempted write has come from a known, verified part of the operating system 413 kernel, then the attempt may be determined to not be suspicious. Likewise, an attempted execution of Fn2 at page eight of virtual memory 404 or at address (H) of physical memory 403 may be intercepted. If the attempted execution was made from a user input, then the execution may be determined to not be suspicious. If the attempted execution was made from the memory of another program, and the program is not on an approved list, then the attempt may be determined to be malicious.

In another example, if Fn1 is a web browser that normally exposes its cache to other applications for purposes of interoperability, below-O/S security agent 420 may allow a specified portion of the memory pages or memory addresses of Fn1 to be read by other applications. However, if Fn1 contains metadata or other information that should be kept private, then below-O/S security agent 420 may secure those portions of the memory pages or memory addresses of Fn1 from being read from any process other than Fn1 itself Once a program has been determined to be suspicious, malicious, or otherwise indicative of malware, then below-O/S security agent 420 may take any suitable corrective action. Below-O/S security agent 420 may, for example, deny a write request to memory page 2 of virtual memory 404 or address (J) of physical memory 403, yet return a result indicating that the value was written. The process generating the request may be monitored for additional attempts to access the resources of electronic device 401, may be stopped, or may be cleaned from electronic device 401. In another example, the attempted execution of page eight of virtual memory 404 or address (H) of physical memory 403 may instead be directed to the execution of a honeypot process or a cleanup process.

The contents of the memory which are secured by below-O/S security agent 420 may include data, code, or any other useful system resources which may be attacked by malware. Below-O/S security agent 420 may protect the contents of memory against malware attempting to, for example, read, write, or hook mechanisms showing the processes running on electronic device 401, inject its code into portions of applications loaded in memory, or change permission and access flags of mapping tables for virtual memory 404. By operating below the level of operating system 413, below-O/S security agent 420 may avoid malware running at the kernel mode level in operating system 413. Below-O/S security agent 420 may accomplish zero-day detection, as in some cases it may not need knowledge that the identity of a requesting entity has been previously determined to be malicious—the fact that the entity is unknown may be used to deny access to some parts of the memory of electronic device 401. If the operating system 413 or antivirus or antimalware measures running in the operating system 413 are completely compromised, the memory may be completely locked from entities running at the level of the operating system.

One application of below-O/S security agent 420 may be to detect an attempted access of the contents of virtual memory 404 even before a read, write, or execution of the specific contents is attempted by detecting a change to the permissions of the particular memory page. The memory tables used by MMU 414 may be resident in memory, in a page of virtual memory 404 itself, and/or address of physical memory 403. An attempt to change the values of the memory table, for example, to change the permissions of a code subsection of a process from "read" to "write," may itself be trapped by below-O/S security agent 420. The memory page of virtual memory 404 or the address of physical memory 403 may be secured by below-O/S security agent 420, and upon a trapped attempt to write a new value to the permissions in such a location, below-O/S security agent 420 may determine whether the requestor of the attempt is allowed to make such changes. For example, if the request to change the permissions of a code subsection of a process arose from a different process, the attempted change in permissions may be denied.

Figure 6:
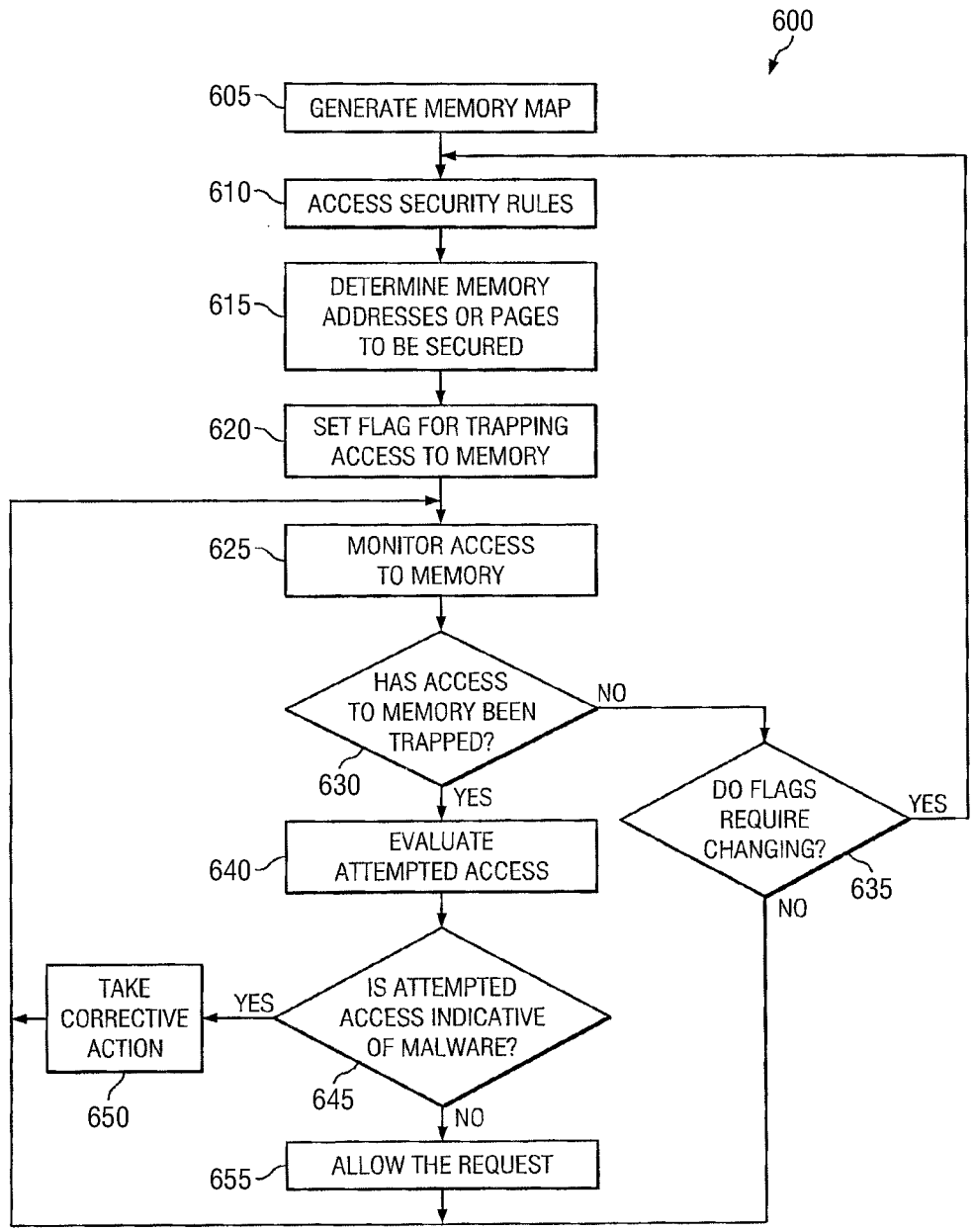
FIG. 6 is an example embodiment of a method for securing memory using below-operating system trapping of attempted access of an electronic device.

FIG. 6 is an example embodiment of a method 600 for securing memory using below-operating system trapping of attempted access of an electronic device. In step 605, the virtual or physical memory of the electronic device may be mapped to determine the identity or owner of the contents of memory. In order to map the memory, for example, a protection server may be accessed; reads, writes, and execution of memory may be tracked; and/or contents of memory scanned and signatures generated for the contents.

In step 610, security rules may be accessed to determine in step 615 addresses of physical memory or pages of virtual memory to be secured. The memory to be secured may depend, for example, upon the security rules, the user of the electronic device, other observed behavior in the electronic device such as indications of malware, previous attempts to access secured memory, or administrator settings. The memory to be secured may change dynamically, as conditions of the operation of the electronic device may change. The security rules may specify entities of the electronic device to be protected, and the location in physical or virtual memory of the entities may be determined by accessing the memory map.

In step 620, flags may be set in a control structure to trap attempted access of memory according to the requirements of the security rules. Such flags may be set for pages of virtual memory and/or addresses of physical memory. Flags may contain an indication of the memory that is to be secured, as well as the kind of access method (for example—read, write, or execute) that is to be flagged. In step 625, access to the secured memory may be monitored to see if an attempted access of the designated type has been made to a designated address or page. In step 630, it may be determined whether an attempt to access the memory has been trapped. If not, then in step 635 it may be determined whether flags of the memory to be secured require changing. If so, then the method 600 may return to step 610 to access security rules to update the flags for guarding access to memory. If not, then the method 600 may return to step 625 to monitor for attempted access of secured memory.

If an attempt to access the memory has been trapped, then beginning in step 640 the trapped attempt may be evaluated. To evaluate the attempt, the memory map may be consulted to determine from where the request was made, and identify the requestor. The values of data to be written may be determined and evaluated for their contents. The nature of the attempt—read, write, or execute—may be considered. These example considerations may be used in conjunction with the security rules to determine whether or not the attempted access is indicative of malware in step 645. If the attempted access is indicative of malware, then in step 650, corrective action may be taken. Such corrective action may include denying the requested access, returning a spoofed value, or initiating a honeypot or corrective process. If the attempted access in not indicative of malware, then in step 655 the request may be allowed. Method 600 may return to step 625 as required to continue securing the memory of the electronic device.

Figure 7:
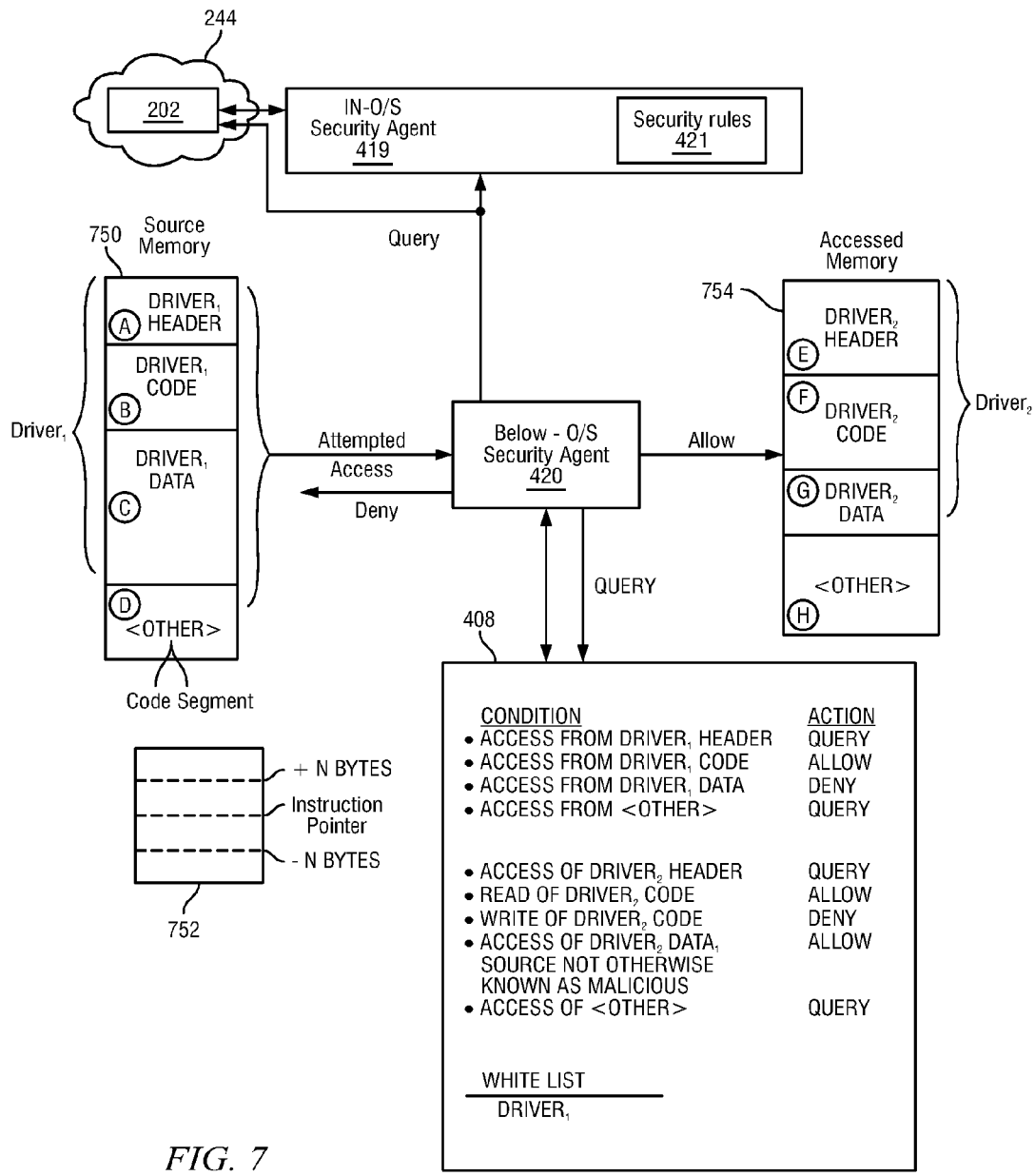
FIG. 7 is an illustration of example operation of a system for real-time module protection.

FIG. 7 is an illustration of example operation of system 400 for real-time module protection. The protection may include regulating software access for securing modules in memory. Such regulating and securing may be performed using below-operating system trapping on an electronic device 401. Modules in memory may be protected by evaluating which portion of an identified entity has generated an attempted access of secured resources. Such a portion may include a subsection of the identified entity. Such a subsection may be identified as distinct from other identified subsections of the identified entity. In one embodiment, it may be evaluated whether an attempt has originated from a header, data, or code subsection of such an entity. In other embodiments, selective evaluation of the entity generating the attempt may be made based on any suitable subsection of the entity. Furthermore, modules in memory may be protected by selectively protecting a specific portion of an identified module. In one embodiment, it may be evaluated whether an attempt has been made on a header, data, or code subsection of the module. In other embodiments, selective evaluation of any suitable subsection of the module may be made.

Attempted access of a protected resource of system 400 may be intercepted by below-O/S security agent 419. The access may be of any suitable portion of system 400, including protected portions of virtualized memory 404 or physical memory 403. Furthermore, the access may be from any portion of system 400, including application 410 or driver 411.

Some methods of determining the malware status of the entity making the attempted access, such as by evaluating a signature of the entity as it resides on disk or by determining if the entity is on a whitelist of known safe entities, may be insufficient. An entity on a whitelist may otherwise cause security agents such as below-O/S security agent 420 and in-O/S security agent 419 to ignore attempts by the entity to access secured portions of system 100. However, malware may modify the entity making the request and thus operate undetected. Such a modification may be such that the signature or other identification of the entity may be unchanged. In addition, creation of a comprehensive, accurate memory map 406 may be difficult, unfeasible, resource intensive. Given an attempt from a particular address, it may not be feasible to trace to the overall entity giving rise to attempt. The trace to the overall entity may be needed to apply an anti-malware signature. Furthermore, such an entity may be resident in system memory, requiring the additional trace to the entity as it resides in storage to apply an anti-malware signature. Determination of this additional trace may not be feasible. System 400 may protect protected resources by determining the specific portion of an entity that is making an attempt, and evaluate the attempted access based on the identification of the specific portion making the attempt.

Furthermore, some methods of determining whether to protect a module or other resource on system 400 may be insufficient. A module may be prone to malware in that it may be manipulated, changed, or otherwise accessed by malware to perform malicious operations on system 400. Thus, the module may be protected by limiting access to the module. However, the module may be open, extensible, and accessible to other entities on system 400 and configured to be edited. Consequently, all access to the module cannot be denied. Moreover, the module may be configured to be accessible by a full range of entities on system 400 and not merely known or trusted entities. For example, the module may include a driver with a data subsection configured to be written to by any suitable entity on system 400. System 400 may protect the module by selectively applying different protections to different subsections of the module. System 400 may determine the specific subsections of the module that is being accessed, and evaluate the attempted access based on the identification of the specific portion being accessed.

Entities and modules in system 400 may include drivers, executables, and other applications, such as application 410, driver 411, and may be resident within portions of virtualized memory 404 or physical memory 403. As such entities and modules are loaded into system memory from storage for execution, the entities and modules may be divided into different subsections.

In one embodiment, as entities and modules within system 400 are resident within system memory, they may include a header subsection. Such a header subsection may include, for example, links to other subsections of the entity or module, definitions of inputs and outputs, definitions of application programming interfaces and functions, and links to the entity or module as it is resident in storage. The header subsection itself may be split across multiple memory pages or multiple memory ranges.

In another embodiment, as entities and modules within system 400 are resident within system memory, they may include a code subsection. Such a code subsection may include the logic, code, or instructions for the functions of the entity or module that are to be executed to perform the operations of the entity or module. The code subsection may be a fixed size or include fixed contents. The code subsection itself may be split across multiple memory pages or multiple memory ranges.

In yet another embodiment, as entities and modules within system 400 are resident within system memory, they may include a data subsection. Such a data subsection may include the data structures and other contents of information used in the functions and execution of the entity or module. The data may be a variable size as the operation of the entity or module progresses and the size required grows or contracts. Furthermore, other entities or modules may be able to write to the data subsection.

Attempts to access secured resources may be made from source memory 750. Source memory 750 may include a view of any combination of system memory, such as virtualized memory 404 or physical memory 403, as elements are resident within system memory. Such elements may include modules, drivers, applications, or any other suitable entity. Source memory 750 may include a modified view of memory map 406 such that all memory pages or memory address ranges for a given entity's subsections are displayed together. The appearance of portions (A), (B), (C), and (D) in source memory 750 may thus not indicate that portions (A), (B), (C), and (D) are actually resident in such an order. Furthermore, each of portions (A), (B), (C), and (D) may include elements not contiguously present within actual virtualized memory 404 or physical memory 403. These portions are presented as contiguous, whole portions for illustrative purposes.

In the example of FIG. 7, source memory 750 may illustrate that Driver1 is resident within the system memory of system 400. Driver1 may be resident within one or more non-contiguous memory pages or address ranges, although Driver1 is shown, for illustrative purposes, as contiguous across portions (A), (B), and (C) of source memory 750. Driver1 may have been loaded into system memory from storage for execution. Driver1 may include one or more subsections. Driver1 may include any suitable number and type of subsections. In one embodiment, Driver1 may include a header subsection in portion (A). In another embodiment, Driver1 may include a code subsection in portion (B). In yet another embodiment, Driver1 may include a data subsection in portion (C). Furthermore, source memory 750 may include any number of other entities or portions thereof, as shown in portion (D).

Secured resources system 400 may include resources represented in accessed memory 754. Such resources may include modules, drivers, or other suitable sensitive resources. Accessed memory 754 may include a view of any combination of system memory, such as virtualized memory 404 or physical memory 403. Accessed memory 754 may include a modified view of memory map 406 such that all memory pages or memory address ranges for a given resource's subsections are displayed together. The appearance of portions (E), (F), (G), and (H) in accessed memory 754 may thus not indicate that portions (E), (F), (G), and (H) are actually resident in such an order. Furthermore, each of portions (E), (F), (G), and (H) may include elements not contiguously present within actual virtualized memory 404 or physical memory 403. These portions are presented as contiguous, whole portions for illustrative purposes.

In the example of FIG. 7, accessed memory 754 may illustrate that Driver2 is resident within the system memory of system 400. Driver2 may be resident within one or more non-contiguous memory pages or address ranges, although Driver2 is shown, for illustrative purposes, as contiguous across portions (E), (F), and (G) of accessed memory 754. Driver2 may have been loaded into system memory from storage for execution. Driver2may include one or more subsections. Driver2 may include any suitable number and type of subsections. In one embodiment, Driver2 may include a header subsection in portion (E). In another embodiment, Driver2 may include a code subsection in portion (F). In yet another embodiment, Driver2 may include a data subsection in portion (G). Furthermore, accessed memory 754 may include any number of other resources or portions thereof, as shown in portion (H).

In one embodiment, entities in system 400 attempting to access secured resources may originate such attempts from memory locations represented in source memory 750. In another embodiment, entities in system 400 attempting to access secured resources may attempt to access such secured resources as they are resident in memory locations as represented in accessed memory 754. System 400, including below-O/S security agent 420 and in-O/S security agent 419, may operate to secure the resources represented in accessed memory 754. Such operation may be described in part in conjunction with FIGS. 1-6, as detailed above.

Below-O/S security agent 420 may trap an attempted access of secured resources shown in accessed memory 754. For a given resource that is accessed in accessed memory 754, below-O/S security agent 420 may determine which subsection of the resource the attempt has targeted. For example, below-O/S security agent 420 may determine not merely that an attempt has been made to access a portion of the module of Driver2, but specifically that an attempt has been made to access a driver header subsection in portion (D), driver code subsection in portion (E), or driver data subsection in portion (F). Below-O/S security agent 420 may make use of memory map 406 to make such a determination.

Based on the determination of which subsection of the secured resource has been accessed, and upon the identity of the secured resource, below-O/S security agent 420 may determine what action to take. Any suitable action may be taken based on a given attempt. In one embodiment, an attempt to access a particular subsection of a secured resource may be generally expected, and thus the attempt may be allowed. Below-O/S security agent 420 may allow such attempts without additional checking, scanning, or other actions. The overhead or processing expense of performing additional checking, scanning, or other actions, such as sending information to in-O/S security agent 419 or protection server 202, may be prohibitive wherein below-O/S security agent 420 traps and evaluates many attempts. For example, an attempt to write to the data subsection of Driver2 in portion (G) may be generally expected and not an indication of malware. Thus, below-O/S security agent 420 may allow the attempt to write or read portion (G) without passing information about the attempt to in-O/S security agent 419 or protection server 202 for further evaluation.

In another embodiment, an attempt to access a particular subsection of a secured resource may be generally considered suspicious, because attempts to read or write to the subsection may be unexpected of normally behaving entities on system 400. Below-O/S security agent 420 may deny such attempts without additional checking, scanning, or other actions. The overhead or processing expense of synchronously performing additional checking, scanning, or other actions may be expensive. For example, an attempt to write to the code subsection of Driver2 may be generally considered suspicious and an indication of malware. Thus, below-O/S security agent 420 may deny the attempt to write to portion (F) without synchronously passing information about the attempt to in-O/S security agent 419 or protection server 202. However, below-O/S security agent 420 may asynchronously pass information about the attempt to in-O/S security agent 419 or protection server 202 for further evaluation, wherein below-O/S security agent 420 does not wait for a reply before performing corrective action.

In yet another embodiment, it may be unknown whether an attempt to access a particular subsection of a secured resource is malicious or safe. In such an embodiment, the attempt may be allowed by default, denied by default, or require additional processing by default. Below-O/S security agent 420 may perform default denial or allowance without additional checking, scanning, or other actions. To perform default additional processing, below-O/S security agent 420 may query portions of system 400 for additional information or scanning about the attempt. The query may include signature comparison or scanning of an entity, as a whole, that is making the attempt, analyzing the contents of the attempt, heuristic analysis about the attempt, or any other suitable anti-malware technique. The query may be made to any suitable entity, such as of protection server 202, in-O/S security agent 419, or of below-O/S security agent 420 itself. Additional analysis by below-O/S security agent 420 may be made by accessing additional rules within security rules 408. Additional analysis by in-O/S security agent 419 may be made by accessing rules within security rules 421. Additional analysis by protection sever 202 may be made by accessing security rules, settings made by anti-malware researchers, or by comparing reports from other systems reporting the attempt. For example, an attempt to access the header subsection of Driver2 may be safe or malicious, depending upon other factors such as the entity making the attempt. Thus, below-O/S security agent 420 may make additional queries for attempts to access portion (G). Such queries may be made synchronously or asynchronously.

Furthermore, a determination of action to take may include considerations of the entity making the attempt or the type of attempt. For example, the entity making the attempt may be known to be malicious. As such, a rule otherwise allowing default access may specify that an attempt from a known malicious entity is denied. In another example, attempts that are attempted reads may be treated differently than attempted writes. A read may be less likely to be associated with malware, or at least less likely to be malicious itself, and thus may be allowed by default wherein a write of the same subsection may be denied. Allowing such reads, even if by malicious entities, may speed up detection by system 400.

Security rules 408 may include rules indicating to below-O/S security agent 420 how to handle attempted access of various subsections of a various identified secured resources. Security rules 408 may include sets of rules for a given secured resource or class of resources. Consequently, different rules may be applied for attempted access of the equivalent subsection of different secured resources. For example, attempted writes of a data subsection of a first driver may be allowed, but attempted writes of a data subsection of a second driver may require an additional check to see if the entity making the attempt is related to the secured resource. In the example of FIG. 7, security rules 408 may include a rule defining that access of the header subsection of Driver2 (portion (E)), may be handled by making an additional query. In another example, security rules 408 may include a rule defining that attempts to read the code subsection of Driver2 (portion (F)), may be allowed. Such attempts may reflect normal operation by other entities of system 400 to execute the functions of Driver2. In yet another example, security rules 408 may include a rule defining that writes to the code subsection of Driver2 (portion (F)), may be denied. In yet another example, security rules 408 may include a rule defining that attempted access of Driver2 data subsection (portion (G)) which originate from a source not otherwise know to be malicious may be allowed. Security rules 408 may include a rule defining that attempted access of other entities, such as those in portion (H), may be handled by security rules not shown or may be handled by causing a query for additional processing.

Below-O/S security agent 420 may trap an attempted access of secured resources by an entity shown in source memory 750. For an entity within source memory 750 making an attempt, below-O/S security agent 420 may determine from which subsection of the entity the attempt originated. For example, below-O/S security agent 420 may determine not merely that an attempt has been made by Driver1 to access a secured resource, but specifically that an attempt has been made from a Driver1 header subsection in portion (A), Driver1 code subsection in portion (B), or Driver1 data subsection in portion (C). Below-O/S security agent 420 may make use of memory map 406 to make such a determination.

Based on the determination of which subsection of an entity made such an attempt, and upon the identity of the entity, below-O/S security agent 420 may determine what action to take. Any suitable action may be taken based on a given attempt. In one embodiment, an attempt to access a secured resource from a particular subsection of an entity may be generally expected, and thus the attempt may be allowed. Below-O/S security agent 420 may allow such attempts without additional checking, scanning, or other actions. The overhead or processing expense of performing additional checking, scanning, or other actions, such as sending information to in-O/S security agent 419 or protection server 202, may be prohibitive wherein below-O/S security agent 420 traps and evaluates many attempts. For example, an attempt from a code subsection of Driver1 in portion (B) may be generally expected and not an indication of malware. Thus, below-O/S security agent 420 may allow attempts from Driver1 code subsection (portion (B)) without passing information about the attempt to in-O/S security agent 419 or protection server 202 for further evaluation.

In another embodiment, an attempt to access secured resources from a particular subsection of an entity may be generally considered suspicious, because such attempts may be unexpected of normally behaving entities on system 400. Below-O/S security agent 420 may deny such attempts without additional checking, scanning, or other actions. The overhead or processing expense of synchronously performing additional checking, scanning, or other actions may be expensive. For example, an attempt to access a secured resource from the data subsection of Driver1 may be generally considered suspicious and an indication of malware. Thus, below-O/S security agent 420 may deny the attempt to access a secured resource from Driver1 code subsection (portion (C)) without synchronously passing information about the attempt to in-O/S security agent 419 or protection server 202. However, below-O/S security agent 420 may asynchronously pass information about the attempt to in-O/S security agent 419 or protection server 202 for further evaluation, wherein below-O/S security agent 420 does not wait for a reply before performing corrective action.

In yet another embodiment, it may be unknown whether an attempt to access secured resources from a particular subsection of a secured resource is malicious or safe. In such an embodiment, the attempt may be allowed by default, denied by default, or require additional processing by default. Below-O/S security agent 420 may perform default denial or allowance without additional checking, scanning, or other actions. To perform default additional processing, below-O/S security agent 420 may query portions of system 400 for additional information or scanning about the attempt. For example, an attempt to access a secured resource from the header subsection of Driver1 may be safe or malicious, depending upon other factors such as the secured resource or expected behavior of the entity. Thus, below-O/S security agent 420 may make additional queries for attempts originating from Driver1 header subsection (portion (A)). Such queries may be made synchronously or asynchronously.

Furthermore, a determination of action to take may include other considerations. For example, the entity making the attempt may be known to be malicious and on a blacklist. In such an example, the determination that the entity as a whole is malicious may override the subsection-specific rules. In another example, the entity making the attempt may be known to be safe and on a whitelist, such as the appearance of Driver1 within security rules 408. In such an example, security rules 408 may include rules allowing default access from Driver1 header and code subsections shown in portions (A) and (B). Nevertheless, even though Driver1 may be included within a whitelist in security rules 408, an attempt originating from the data subsection of Driver1 shown in portion (C) may be suspicious or malicious. Such a discrepancy between the whitelist and the observed actions may result from an incorrect whitelist or require additional verification or reporting. As such, even though Driver1 may be included within a whitelist in security rules 408, security rules 408 may include a rule overriding the whitelist and indicating that an attempt originating from a Driver1 data subsection shown in portion (C) is to be denied by default or cause a query to be generated.

Security rules 408 may include rules indicating to below-O/S security agent 420 how to handle attempted access of a secured resource by various subsections of a given entity. For example, security rules 408 may include a rule defining that access originating from the header subsection of Driver1 (portion (A)) may be handled by making an additional query. In another example, security rules 408 may include a rule defining that access originating from the code subsection of Driver1 (portion (B)) may be allowed by default. Such attempts may reflect normal operation of Driver1 to execute its functions. Such a rule may be subject to other rules defining access of the given secured resource, such as requirements that only certain entities be allowed to make such access. In yet another example, security rules 408 may include a rule defining that attempted access originating from the data subsection of Driver1 (portion (C)), may be denied. Security rules 408 may include a rule defining that attempted access by other entities, such as those in portion (D), may be handled by security rules not shown or may be handled by causing a query for additional processing.

Determination of the precise subsection of the entity making an attempted access of a secured resource may be difficult. A comprehensive or completely accurate memory map 406 may be unavailable or not practical. To determine a specific subsection of an attempted access of a secured resource, below-O/S security agent 416 may be configured to determine a byte string corresponding to a range including the instruction pointer address that caused an attempted access of secured resources. In a further embodiment, such a byte string may include at least a certain number of bytes, 2*N. In another further embodiment, such a byte string may include the byes surrounding the instruction pointer which caused the attempt, plus or minus N bytes. Such a byte string may represent contiguous code bytes within the same process that made the attempt. The byte string may be illustrated in segment 752. Segment 752 may illustrate a contiguous block of instructions, operation codes, or other information from source memory 750. Such a contiguous block may include a contiguous block of information within a memory page or in a memory address range. Segment 752 may represent any suitable portion of source memory 750.

Below-O/S security agent 416 may compare the byte string against known safe or known malicious byte strings without attempting to determine a signature or hash of the overall entity responsible for the attempt. Furthermore, below-O/S security agent 416 may use such a byte string within the context of security rules 408, which may use such byte strings as an index for its rules. For example, various parts of portion (B), representing the code subsection of Driver1, known to launch attempts to access secured resources may include byte strings which are recorded in security rules 408. Thus, an attempted access matching the byte string may be determined to be associated with the code subsection of Driver1 in portion (B). Security rules 408 may then define the appropriate action to take. In one embodiment, a hash of the byte string may be used.

Figure 8:
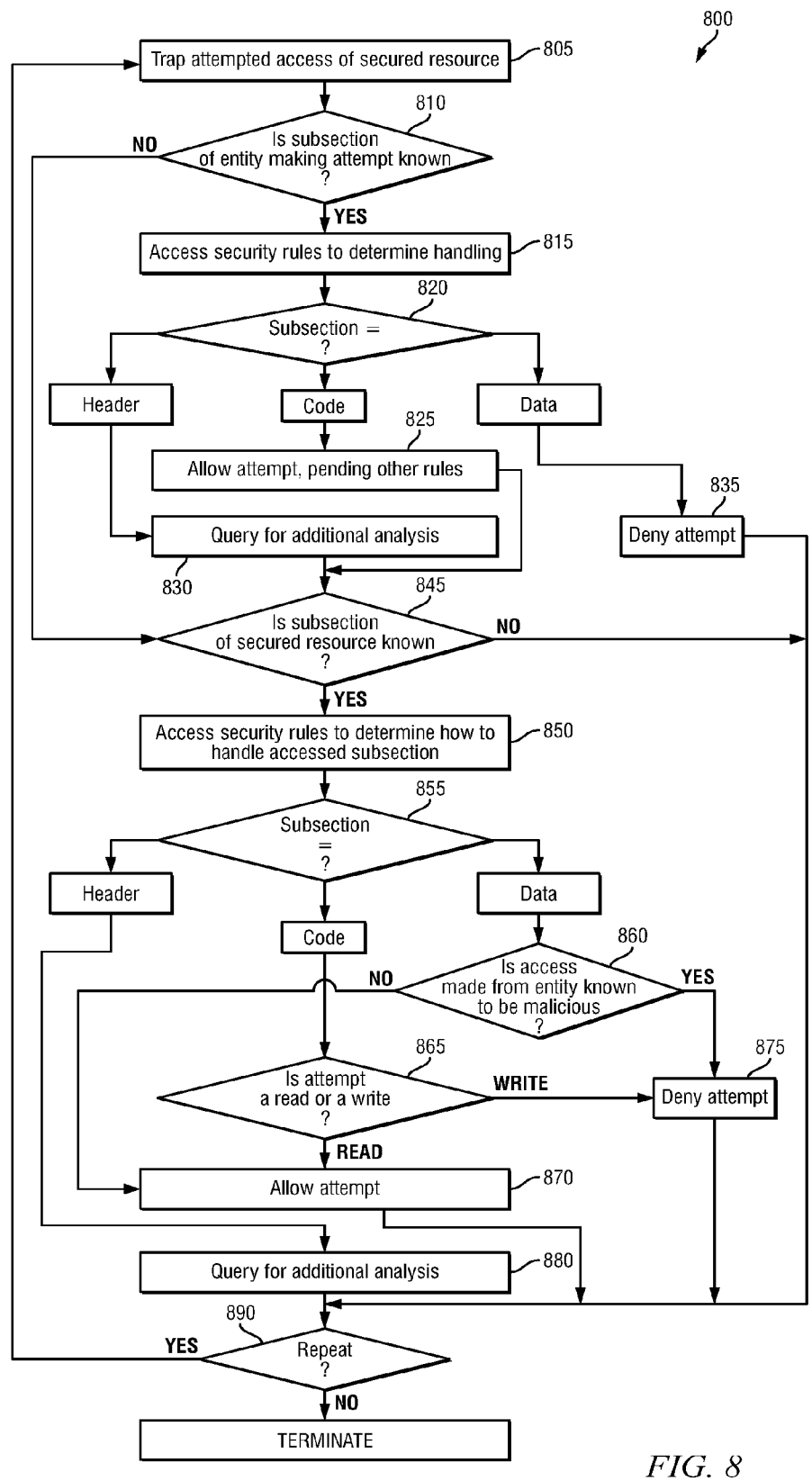
FIG. 8 is an example embodiment of a method for real-time module protection.

FIG. 8 is an example embodiment of a method for real-time module protection. The protection may include regulating software access for securing modules in memory.

In 805, an attempted access of secured resources may be trapped. The trapping may be conducted by a below-operating system trapping agent. The subsequent handling of the trapped attempt may be handled at least in part by a below-operating system handling agent. The resources may include a portion of secured system memory and modules, drivers, applications, or other entities resident thereon. Such memory may be defined according to physical or virtual memory. The secured resources resident within the memory may be mapped in a memory map according to the location of various subsections of a given entity.

In 810, it may be determined whether the attempt was made by a memory location known as an identified subsection of an entity. Such subsections may include, for example, a header, data, and code subsection. In one embodiment, analysis of whether the entity's subsection is known may be based upon a memory map. In another embodiment, analysis of whether the entity's subsection is known may be based upon a byte string including the instruction pointer that yielded the attempt. If the entity's subsection is known, method 800 may proceed to 815. If not, method 800 may proceed to 845.

In 815, security rules may be accessed to determine how to handle an attempted access from a given subsection of an entity. Such a determination may be used within the context of 820. In 820, it may be determined which subsection of the secured resource made the attempt. The handling of such an attempt by a specific subsection may vary according to the identity of the specific entity making the attempt. For example, a code subsection from operating system kernels, entities related to the module being accessed, or signed drivers may be allowed access wherein a code subsection from unsigned drivers, unknown drivers, or entities unrelated to the module being accessed may be denied. In one embodiment, if the attempt was by a header subsection, method 800 may proceed to 830. In various other embodiments, if the attempt was by a header subsection, method 800 may proceed to 835 or 825. In another embodiment, if the attempt was by a data subsection, method 800 may proceed to 835. In various other embodiments, if the attempt was by a data subsection, method 800 may proceed to 830 or 825. In yet another embodiment, if the attempt was by a code subsection, method 800 may proceed to 825. In various other embodiments, if the attempt was by a code subsection, method 800 may proceed to 830 or 835. If the attempt was by no such subsections, by another identified subsection, or by an unidentified subsection, method 800 may proceed by default to 830.

In 825, the attempt may be allowed. In one embodiment, the attempt may be allowed pending the application of other anti-malware rules that may override the allowance of the attempt. For example, if the overall entity making the attempt is otherwise determined to be malicious, the attempt may instead be denied. In another embodiment, the attempt may be allowed by a below-operating system handling agent without making reference to above-operating system elements. Method 800 may proceed to 845.

In 830, a query for additional analysis on the attempt may be made. Such analysis may be synchronous or asynchronous. The analysis may include, for example, scanning, signature-matching, or heuristic analysis. The analysis may utilize, for example, the contents or identity of the entity making the attempt, the contents or identity of the secured resource, or the contents of the attempted change.

In 835, the attempt may be denied. In one embodiment, the attempt may be denied by a below-operating system handling agent without making reference to above-operating system elements. Method 800 may proceed to 890.

In 845, it may be determined whether the attempt was made on an identified subsection of a secured resource. Such subsections may include, for example, a header, data, and code subsection. In one embodiment, analysis of whether the subsection is known may be based upon a memory map. If the subsection is known, method 800 may proceed to 850. If not, method 800 may proceed to 890.

In 850, security rules may be accessed to determine how to handle an attempted access for given subsection of a secured resource. Such a determination may be used within the context of 855. The handling of an attempt of a specific subsection of a module may vary according to the identity of module. For example, attempted access of operating system kernels, critical device drivers, or other critical components may trigger stricter access requirements than attempted access of drivers by entities related to the drivers. In 855, it may be determined which subsection of the secured resource was targeted. In one embodiment, if the attempt was for a header subsection, method 800 may proceed to 880. In various other embodiments, if the attempt was for a header subsection, method 800 may proceed to 860, 865, 870, or 875 for conditional or absolute allowance or denial. In another embodiment, if the attempt was for a data subsection, method 800 may proceed to 860. In various other embodiments, if the attempt was for a data subsection, method 800 may proceed to 865, 870, 875, or 880 for a query, conditional or absolute allowance, or conditional or absolute denial. In yet another embodiment, if the attempt was for a code subsection, method 800 may proceed to 865. In various other embodiments, if the attempt was for a code subsection, method 800 may proceed to 860, 870, 875, or 880 for a query, conditional or absolute allowance, or conditional or absolute denial. If the attempt was for such subsections, for another identified subsection, or for an unidentified subsection, method 800 may proceed by default to 880. Such an attempt may be handled according to the identity of the targeted module without consideration of a specific subsection.

In 860, it may be determined whether the attempt was from an entity that is otherwise known to be malicious. Such a determination may not require a definitive determination that the entity is safe or malicious. If the entity's malware status is unknown or known to be safe, then it may be determined that the entity was not otherwise known to be malicious. If the entity is known to be malicious, method 800 may proceed to 875. If the entity is not know to be malicious, method 800 may proceed to 870.

In 865, it may be determined whether the attempt was an attempted read or an attempted write. If the attempt was a read, method 800 may proceed to 870. If the attempt was a write, method 800 may proceed to 875.

In 870, the attempt may be allowed. In one embodiment, the attempt may be allowed pending the application of other anti-malware rules that may override the allowance of the attempt. For example, if the entity making the attempt is otherwise determined to be malicious, the attempt may instead be denied. In another embodiment, the attempt may be allowed by a below-operating system handling agent without making reference to above-operating system elements. Method 800 may proceed to 890.

In 875, the attempt may be denied. In one embodiment, the attempt may be denied by a below-operating system handling agent without making reference to above-operating system elements. Method 800 may proceed to 890.

In 880, a query for additional analysis on the attempt may be made. Such analysis may be synchronous or asynchronous. The analysis may include, for example, scanning, signature-matching, or heuristic analysis. The analysis may utilize, for example, the contents or identity of the entity making the attempt, the contents or identity of the secured resource, or the contents of the attempted change.

In 890, method 800 may repeat and return to any previous element such as 805, or method 800 may terminate.

Although FIGS. 3, 6, and 8 disclose a particular number of steps to be taken with respect to example methods 300, 600, and 800, methods 300, 600, and 800 may be executed with more or fewer steps than those depicted in FIGS. 3, 6, and 8. In addition, although FIGS. 3, 6, and 8 disclose a certain order of steps to be taken with respect to methods 300, 600, and 800, the steps comprising these methods may be completed in any suitable order. Furthermore, some or all steps of methods 300, 600, and 800 may be combined with steps from other methods of methods 300, 600, and 800.

Methods 300, 600, and 800 may be implemented using the systems of FIG. 1-2, 4-5, or 7-8. In certain embodiments, methods 300, 600, and 800 may be implemented partially or fully in software embodied in computer-readable storage media.

Program instructions may be used to cause a general-purpose or special-purpose processing system that is programmed with the instructions to perform the operations described above. The operations may be performed by specific hardware components that contain hardwired logic for performing the operations, or by any combination of programmed computer components and custom hardware components. The methods described herein may be provided as a computer program product that may include one or more machine readable media having stored thereon instructions that may be used to program a processing system or other electronic device to perform the methods. The terms "machine readable medium" or "computer readable medium" used herein shall include any medium that is capable of storing or encoding a sequence of instructions for execution by the machine and that cause the machine to perform any one of the methods described herein. The term "machine readable medium" shall accordingly include, but not be limited to, memories such as solid-state memories, optical and magnetic disks. Furthermore, it is common in the art to speak of software, in one form or another (e.g., program, procedure, process, application, module, logic, and so on), as taking an action or causing a result. Such expressions are merely a shorthand way of stating that the execution of the software by a processing system causes the processor to perform an action or produce a result.

One or more of systems 100, 200, 400, 500, and 700 may be combined with other portions of systems 100, 200, 400, 500, and 700.

The following examples pertain to further embodiments.

A method for securing an electronic device may include trapping an attempt to access a secured system resource of the electronic device. The method may further include determining a module associated with the attempt. The module may include comprising a plurality of distinct subsections. Also, the method may include determining a subsection of the module associated with the attempt. The subsection may include a memory location associated with the attempt. The method may additionally include, based on the determination of the module and the determination of the subsection, accessing a security rule to determine whether to allow the attempted access. Furthermore, the method may include handling the attempt based on the security rule. The trapping may be conducted at a level below all of the operating systems of an electronic device. Handling the attempt may be conducted at least in part at a level below all of the operating systems of the electronic device. The memory location may identify a point of origin of the attempt. Furthermore, the memory location may identify a target point of the attempt. The subsection may include a data subsection. Also, the subsection may include a header subsection. Moreover, the subsection may include a code subsection. Handling the attempt may include denying an attempted write to the code subsection, the header subsection, or the data subsection. Furthermore, handling the attempt may include allowing an attempted write to the code subsection, the header subsection, or the data subsection. Also, handling the attempt may include denying an attempted write from the code subsection, the header subsection, or the data subsection. Moreover, handling the attempt may include allowing an attempted read to the code subsection, the header subsection, or the data subsection. Furthermore, handling the attempt may include making an additional query to determine a malware status of the attempt.

At least one machine readable storage medium may include computer-executable instructions carried on the computer readable medium. The instructions may be readable by a processor. The instructions, when read and executed, may cause the processor to trap an attempt to access a secured system resource of the electronic device. The processor may be further caused to determine a module associated with the attempt. The module may include comprising a plurality of distinct subsections. Also, the processor may be caused to determine a subsection of the module associated with the attempt. The subsection may include a memory location associated with the attempt. Also, the processor may be caused to, based on the determination of the module and the determination of the subsection, access a security rule to determine whether to allow the attempted access. Furthermore, the processor may be caused to handle the attempt based on the security rule. The trapping may be conducted at a level below all of the operating systems of an electronic device. Handling the attempt may be conducted at least in part at a level below all of the operating systems of the electronic device. The memory location may identify a point of origin of the attempt. Furthermore, the memory location may identify a target point of the attempt. The subsection may include a data subsection. Also, the subsection may include a header subsection. Moreover, the subsection may include a code subsection. Handling the attempt may include denying an attempted write to the code subsection, the header subsection, or the data subsection. Furthermore, handling the attempt may include allowing an attempted write to the code subsection, the header subsection, or the data subsection. Also, handling the attempt may include denying an attempted write from the code subsection, the header subsection, or the data subsection. Moreover, handling the attempt may include allowing an attempted read to the code subsection, the header subsection, or the data subsection. Furthermore, handling the attempt may include making an additional query to determine a malware status of the attempt.

A system for securing an electronic device may include a memory, a processor, a secured system resource, and one or more security agents. The security agents may include instructions resident in the memory and may be operable for execution by the processor. The security agents may be configured to trap an attempt to access a secured system resource of the electronic device. The security agents may be further configured to determine a module associated with the attempt. The module may include comprising a plurality of distinct subsections. Also, security agents may be configured to determine a subsection of the module associated with the attempt. The subsection may include a memory location associated with the attempt. Also, the security agents may be configured to, based on the determination of the module and the determination of the subsection, access a security rule to determine whether to allow the attempted access. Furthermore, the security agents may be configured to handle the attempt based on the security rule. The trapping may be conducted at a level below all of the operating systems of an electronic device. Handling the attempt may be conducted at least in part at a level below all of the operating systems of the electronic device. The memory location may identify a point of origin of the attempt. Furthermore, the memory location may identify a target point of the attempt. The subsection may include a data subsection. Also, the subsection may include a header subsection. Moreover, the subsection may include a code subsection. Handling the attempt may include denying an attempted write to the code subsection, the header subsection, or the data subsection. Furthermore, handling the attempt may include allowing an attempted write to the code subsection, the header subsection, or the data subsection. Also, handling the attempt may include denying an attempted write from the code subsection, the header subsection, or the data subsection. Moreover, handling the attempt may include allowing an attempted read to the code subsection, the header subsection, or the data subsection. Furthermore, handling the attempt may include making an additional query to determine a malware status of the attempt.

A system for securing an electronic device may include means for securing an electronic device and may include trapping an attempt to access a secured system resource of the electronic device. The system may further include means for determining a module associated with the attempt. The module may include comprising a plurality of distinct subsections. Also, the system may include means for determining a subsection of the module associated with the attempt. The subsection may include a memory location associated with the attempt. The system may additionally include means for, based on the determination of the module and the determination of the subsection, accessing a security rule to determine whether to allow the attempted access. Furthermore, the system may include means for handling the attempt based on the security rule. The trapping may be conducted at a level below all of the operating systems of an electronic device. Handling the attempt may be conducted at least in part at a level below all of the operating systems of the electronic device. The memory location may identify a point of origin of the attempt. Furthermore, the memory location may identify a target point of the attempt. The subsection may include a data subsection. Also, the subsection may include a header subsection. Moreover, the subsection may include a code subsection. Handling the attempt may include denying an attempted write to the code subsection, the header subsection, or the data subsection. Furthermore, handling the attempt may include allowing an attempted write to the code subsection, the header subsection, or the data subsection. Also, handling the attempt may include denying an attempted write from the code subsection, the header subsection, or the data subsection. Moreover, handling the attempt may include allowing an attempted read to the code subsection, the header subsection, or the data subsection. Furthermore, handling the attempt may include making an additional query to determine a malware status of the attempt.

Although the present disclosure has been described in detail, it should be understood that various changes, substitutions, and alterations can be made hereto without departing from the spirit and the scope of the disclosure as defined by the appended claims.

What is claimed is:

1. A method for securing an electronic device, comprising:
   trapping an attempt to access a secured system resource of the electronic device;
   determining a module associated with the attempt, the module comprising a plurality of distinct subsections;
   determining a subsection of the module associated with the attempt, the subsection including a memory location associated with the attempt, including:
      determining a byte string corresponding to a range including an instruction address that caused the attempt, the range to include a defined number of bytes surrounding the instruction address; and
      comparing the byte string against mappings of the subsection in a security rule;
   based on the determination of the module and the determination of the subsection, accessing the security rule to determine whether to allow the attempt; and
   handling the attempt based on the security rule.

2. The method of claim 1, wherein:
   the trapping is conducted at a level below all of the operating systems of the electronic device; and
   handling the attempt is conducted at least in part at a level below all of the operating systems of the electronic device.

3. The method of claim 1, wherein the memory location identifies a point of origin of the attempt.

4. The method of claim 1, further comprising:
   identifying another memory location that identifies a target point of the attempt; and
   accessing the security rule to determine whether to allow the attempt further based upon the target point of the attempt.

5. The method of claim 1, further comprising:
   identifying another subsection as a target of the attempt and as a data subsection; and accessing the security rule to determine whether to allow the attempt further based upon the identification of the other subsection as a target of the attempt and as a data subsection.

6. The method of claim 1, further comprising:
identifying another subsection as a target of the attempt and as a header subsection; and
accessing the security rule to determine whether to allow the attempt further based upon the identification of the other subsection as a target of the attempt and as a header subsection.

7. The method of claim 1, further comprising:
identifying another subsection as a target of the attempt and as a code subsection; and
accessing the security rule to determine whether to allow the attempt further based upon the identification of the other subsection as a target of the attempt and as a code subsection.

8. The method of claim 1, wherein the security rule:
identifies a target of the attempt as a code subsection; and
based at least on an identification of the target of the attempt as a code subsection, specifies that handling the attempt includes denying an attempted write to the code subsection.

9. The method of claim 1, wherein the security rule:
identifies a target of the attempt as a header subsection; and
based at least on an identification of the target of the attempt as a header subsection, specifies that handling the attempt includes denying an attempted write to the header subsection.

10. The method of claim 1, wherein the security rule:
identifies a target of the attempt as a data subsection; and
based at least on an identification of the target of the attempt as a data subsection, specifies that handling the attempt includes allowing an attempted write to the data subsection.

11. At least one non-transitory machine readable storage medium, comprising computer-executable instructions carried on the non-transitory machine readable medium, the instructions readable by a processor, the instructions, when read and executed, for causing the processor to:
trap an attempt to access a secured system resource of an electronic device;
determine a module associated with the attempt, the module comprising a plurality of distinct subsections;
determine a subsection of the module associated with the attempt, the subsection including a memory location associated with the attempt, including instructions for further causing the processor to:
determine a byte string corresponding to a range including an instruction address that caused the attempt, the range to include a defined number of bytes surrounding the instruction address; and
compare the byte string against mappings of the subsection in a security rule;
based on the determination of the module and the determination of the subsection, access the security rule to determine whether to allow the attempt; and
handle the attempt based on the security rule.

12. The medium of claim 11, wherein:
the trapping is conducted at a level below all of the operating systems of the electronic device; and
handling the attempt is conducted at least in part at a level below all of the operating systems of the electronic device.

13. The medium of claim 11, wherein the memory location identifies a point of origin of the attempt.

14. The medium of claim 11, further comprising instructions for causing the processor to:
identify another memory location as a target point of the attempt; and
access the security rule to determine whether to allow the attempt further based upon the target point of the attempt.

15. The medium of claim 11, further comprising instructions for causing the processor to:
identify another subsection as a target of the attempt and as a data subsection; and
access the security rule to determine whether to allow the attempt further based upon the identification of the other subsection as a target of the attempt and as a data subsection.

16. The medium of claim 11, further comprising instructions for causing the processor to:
identify another subsection as a target of the attempt and as a header subsection; and
access the security rule to determine whether to allow the attempt further based upon the identification of the other subsection as a target of the attempt and as a header subsection.

17. The medium of claim 11, further comprising instructions for causing the processor to:
identify another subsection as a target of the attempt and as a code subsection; and
access the security rule to determine whether to allow the attempt further based upon the identification of the other subsection as a target of the attempt and as a code subsection.

18. The medium of claim 11, wherein the security rule:
identifies a target of the attempt as a code subsection; and
based at least on an identification of the target of the attempt as a code subsection, specifies that handling the attempt includes denying an attempted write to the code subsection.

19. The medium of claim 11, wherein the security rule:
identifies a target of the attempt as a header subsection; and
based at least on an identification of the target of the attempt as a header subsection, specifies that handling the attempt includes denying an attempted write to the header subsection.

20. The medium of claim 11, wherein the security rule:
identifies a target of the attempt as a data subsection; and
based at least on an identification of the target of the attempt as a data subsection, specifies that handling the attempt includes allowing an attempted write to the data subsection.

21. A system for securing an electronic device, comprising:
a memory;
a processor;
a secured system resource; and
one or more security agents including instructions resident in the memory and operable for execution by the processor, wherein the security agents are configured to:
trap an attempt to access the secured system resource;
determine a module associated with the attempt, the module comprising a plurality of distinct subsections;
determine a subsection of the module associated with the attempt, the subsection including a memory location associated with the attempt, wherein the security agents are further configured to:
determine a byte string corresponding to a range including an instruction address that caused the attempt, the range to include a defined number of bytes surrounding the instruction address; and compare the byte string against mappings of the subsection in a security rule;

based on the determination of the module and the determination of the subsection, accessing the security rule to determine whether to allow the attempt; and handling the attempt based on the security rule.

22. The system of claim 21, wherein the security agents are further configured to:

conduct the trapping at a level below all of the operating systems of the electronic device; and conduct the handling at least in part at a level below all of the operating systems of the electronic device.

23. The system of claim 21, wherein the memory location identifies a point of origin of the attempt.

24. The system of claim 21, wherein the security agents are further configured to:

identify another memory location that identifies a target point of the attempt; and accessing the security rule to determine whether to allow the attempted access further based upon the target point of the attempt.

25. The system of claim 21, wherein the security agents are further configured to:

identify another subsection as a target of the attempt and as a data subsection; and access the security rule to determine whether to allow the attempted access further based upon the identification of the other subsection as a target of the attempt and as a data subsection.

26. The system of claim 21, wherein the security agents are further configured to:

identify another subsection as a target of the attempt and as a header subsection; and access the security rule to determine whether to allow the attempted access further based upon the identification of the other subsection as a target of the attempt and as a header subsection.

27. The system of claim 21, wherein the security agents are further configured to:

identify another subsection as a target of the attempt and as a code subsection; and access the security rule to determine whether to allow the attempted access further based upon the identification of the other subsection as a target of the attempt and as a code subsection.

28. The system of claim 21, wherein the security rule:

identifies a target of the attempt as a code subsection; and based at least on an identification of the target of the attempt as a code subsection, specifies that handling the attempt includes denying an attempted write to the code subsection.

29. The system of claim 21, wherein the security rule:

identifies a target of the attempt as a header subsection; and based at least on an identification of the target of the attempt as a header subsection, specifies that handling the attempt includes denying an attempted write to the header subsection.

30. The system of claim 21, wherein the security rule:

identifies a target of the attempt as a data subsection; and based at least on an identification of the target of the attempt as a data subsection, specifies that handling the attempt includes allowing an attempted write to the data subsection.

\* \* \* \* \*